US008065257B2

(12) United States Patent
Kuecuekyan

(10) Patent No.: US 8,065,257 B2
(45) Date of Patent: Nov. 22, 2011

(54) SYSTEM AND METHOD FOR CORRELATING PAST ACTIVITIES, DETERMINING HIDDEN RELATIONSHIPS AND PREDICTING FUTURE ACTIVITIES

(75) Inventor: Horen Kuecuekyan, Chantilly, VA (US)

(73) Assignee: Saab Sensis Corporation, East Syracuse, NY (US)

( * ) Notice: Subject to any disclaimer, the term of this patent is extended or adjusted under 35 U.S.C. 154(b) by 0 days.

(21) Appl. No.: 12/997,950

(22) PCT Filed: Jul. 27, 2010

(86) PCT No.: PCT/US2010/043301
§ 371 (c)(1),
(2), (4) Date: May 9, 2011

(87) PCT Pub. No.: WO2011/014471
PCT Pub. Date: Feb. 3, 2011

(65) Prior Publication Data
US 2011/0208681 A1     Aug. 25, 2011

Related U.S. Application Data

(60) Provisional application No. 61/228,645, filed on Jul. 27, 2009.

(51) Int. Cl.
G06F 17/00     (2006.01)
G06F 7/00      (2006.01)
G06N 5/02      (2006.01)
G06N 5/00      (2006.01)

(52) U.S. Cl. .............................. 706/46; 706/45; 707/603
(58) Field of Classification Search ........................ None
See application file for complete search history.

(56) References Cited

U.S. PATENT DOCUMENTS

| | | | |
|---|---|---|---|
| 6,742,128 B1 * | 5/2004 | Joiner | 726/25 |
| 7,774,744 B2 * | 8/2010 | Moore et al. | 717/104 |
| 2003/0039949 A1 | 2/2003 | Cappellucci et al. | |
| 2005/0050537 A1 * | 3/2005 | Thompson et al. | 717/165 |
| 2005/0108306 A1 | 5/2005 | Catalasan | |
| 2006/0230071 A1 * | 10/2006 | Kass et al. | 707/104.1 |
| 2007/0011108 A1 | 1/2007 | Benson et al. | |
| 2007/0038587 A1 * | 2/2007 | Watanabe et al. | 706/21 |
| 2008/0097821 A1 | 4/2008 | Chickering et al. | |
| 2009/0172507 A1 * | 7/2009 | Choe | 714/819 |
| 2009/0234810 A1 * | 9/2009 | Angell et al. | 707/3 |

OTHER PUBLICATIONS

Salerno, J. et al.; "Building a Framework for Situation Awareness"; 2004; In Proceedings of the Seventh International Conference on Information Fusion, vol. I; pp. 219-226.*

* cited by examiner

Primary Examiner — Jeffrey A Gaffin
Assistant Examiner — Stanley K Hill
(74) Attorney, Agent, or Firm — Burr & Brown

(57) ABSTRACT

A system and method of data correlation and analysis of past activities and prediction of future activity that includes establishing a database comprising structured metadata on at least one computer and a distributed system of networked computers having a plurality of access levels, configuring a database front-end to parse incoming data, the database front-end defining a plurality of entities and events, each having one or more attributes, and correlation IDs, which are user defined attribute relationships that correlate events and entities, collecting data, parsing the incoming data in the database front-end into structured metadata, the distributed analysis engine correlating the incoming structured metadata with structured metadata in the database and determining micro-patterns in the structured metadata, generating a graphical representation of a composite network of the determined micro-patterns as super-objects, and predicting future activity from the one or more super-objects representing the determined micro-patterns.

27 Claims, 19 Drawing Sheets

SYSTEM AND METHOD FOR CORRELATING PAST ACTIVITIES, DETERMINING HIDDEN RELATIONSHIPS AND PREDICTING FUTURE ACTIVITIES

U.S. GOVERNMENT RIGHTS

This invention was made with United States Government support under the RADII (Rapid Assessment and Dissemination Information Infrastructure) initiative of USAF prime contract FA8750-06-D-0005-001. The United States Government has certain rights in the invention.

FIELD OF THE INVENTION

The present invention relates to a system and method for predicting future activities using a distributed analysis engine to parse incoming data into structured data including entities, events, attributes and correlation IDs and determine deep nested and hidden relationships in the structured data to predict future activities.

BACKGROUND OF THE INVENTION

Electronic storage mechanisms have enabled accumulation of massive amounts of data. For instance, data that previously required volumes of books for recordation can now be stored electronically without expense of printing paper and with a fraction of space needed for storage of paper. In one particular example, deeds and mortgages that were previously recorded in paper volumes can now be stored electronically. Moreover, advances in sensors technology now enables massive amounts of data to be collected in real-time. For instance, satellite based navigation systems, such as GPS, can determine the location of an individual or entity using satellites and receivers. The emergence of the internet and mobile computing devices has created new opportunities for data gathering in real-time. Computers and electronic storage devices can retain and store vast amounts of data from sensors and other data collection devices. Collected data relating to particular contexts and/or applications can be employed in connection with data trending and analysis, and predictions can be made as a function of received and analyzed data.

Predictive models utilized on computer systems can often produce more accurate predictive results than a human, as computer systems may have access to a substantial amount of data. For instance, a computer application can have access to data that represents traffic patterns over twenty years, whereas an individual may have experienced traffic patterns for a shorter period of time. These predictive models can be quite effective when generating predictions associated with common occurrences. Predictive models, however, can overwhelm an individual with predictions that may include superfluous information. Furthermore, predictive models can fail when used to predict events that are atypical, such as criminal activities or financial market activities. Reasons for failure can include lack of a necessary understanding of a situation, lack of critical data, infrequency of occurrence of an event, and other factors.

Simple causal-sequenced events (chain events) can be adequately modeled using existing physical models. However, activities by criminal and terrorist organizations not only attempt to hide their activities, but will act on opportunity rather than adhering to a predefined process. The impact of their opportunity based methods changes the sequence which renders the physical models ineffective for predicting future activity and events. Another example is where an adversary changes their methods, tactics, and procedures which renders the physical models ineffective for predicting future activity and events.

What is needed is a system and method that adequately models obfuscated relationships that are hidden within large complex datasets to predict future activities.

SUMMARY OF THE INVENTION

According to a first aspect of the present invention, there is provided a method of data correlation and analysis of past activities and prediction of future activity using a distributed analysis engine, the method comprising establishing a database comprising structured metadata on at least one computer and a distributed system of networked computers comprising a plurality of levels each having at least one personal computer, wherein an entry level of the plurality of levels further comprises at least one personal digital assistant or hand held computer, configuring a database front-end to parse incoming data, the database front-end defining a plurality of entities, one or more attributes for each entity of the plurality of entities, a plurality of events, one or more attributes for each event of the plurality of events, and one or more correlation IDs, the correlation IDs being user defined attribute relationships that correlate events and entities in the database, collecting data from a plurality of sources, and parsing the incoming data in the database front-end into structured metadata comprising one or more of entities, attributes, events and correlation IDs. The method further comprising the distributed analysis engine correlating structured metadata of the incoming data with structured metadata in the database, determining micro-patterns in the structured metadata using said distributed analysis engine, generating a graphical representation of a composite network of determined micro-patterns in the structured metadata between events and entities in the incoming structured metadata and structured metadata in the database as one or more super-objects, and predicting future activity from the one or more super-objects representing the determined micro-patterns. The present invention uses correlation IDs to determine hidden, deep nested dynamic and static relationships between events and entities in the structured metadata of the incoming data and structured metadata in the database.

In some embodiments of the present invention, determining micro-patterns in the structured metadata further comprises comparing a portion of the structured metadata in the database with the structured metadata of the incoming data and sequentially comparing other portions of the structured metadata in the database with the structured metadata of the incoming data. In some embodiments, the portions of the structured metadata in the database are random portions that are less than 30% of the structured metadata in the database.

In some embodiments, the collected data comprises at least one of numeric data and binary data. In other embodiments, the collected data comprises at least one of imagery data, natural language text, observation data and categorical data. In embodiments of the present invention, a super-object comprises a vertex and a plurality of edges, each edge representing a correlation between at least one of different entities, entities and events, and different events in the data and the vertex of the super-object has the most edges in the super-object.

In some embodiments, the method further comprises conditioning the incoming data to fill in missing values within a context before parsing the incoming data into structured metadata. In other embodiments, determining micro-patterns in the data to generate super-objects further comprises the steps of identifying relationships among attributes of different entities, determining the strength of the identified relationships, and generating super-objects for reporting and display to a user. In some embodiments, the step of determining the strength of the identified relationships comprises using statistical methods to obtain a distribution function for one or more correlation IDs.

In some embodiments, at least some of the past activities are selected from the group consisting of social network activities, criminal activities, terrorist activities, IED activities, computer network activities, and financial activities, and the predicted future activity is an activity of the same type.

According to a second aspect of the present invention, there is provided a distributed system of networked computers having a distributed analysis engine for data correlation and analysis of past activities and prediction of future activity, the system comprising a distributed system of networked computers comprising a plurality of levels each having at least one personal computer, wherein an entry level further comprises at least one personal digital assistant or hand held computer; and a database comprising structured metadata, the database further comprising a database front-end configured to parse incoming data, wherein the database front-end defines a plurality of entities, one or more attributes for each entity of the plurality of entities, a plurality of events, one or more attributes for each event of the plurality of events, and one or more correlation IDs, the correlation IDs being user defined attributes that correlate between events and entities in the database, wherein the distributed system of networked computers receives data from a plurality of sources. The system further comprising a database front-end parses the incoming data into structured metadata comprising one or more of entities, attributes, events and correlation IDs, and the distributed analysis engine correlates the structured metadata of the incoming data with structured metadata in the database, determines micro-patterns in the structured metadata, generates a graphical representation of a composite network of determined micro-patterns in the structured metadata between events and entities in the data as one or more super-objects, and predicts future activity from the one or more super-objects representing the determined micro-patterns in the structured metadata.

In some embodiments of the present invention, the structured metadata in the database is accessible from multiple distributed locations, each location having one or more levels of access. In these embodiments, the levels of access are hierarchical with each increasing level of access having access to more detailed information.

The system of the present invention uses correlation IDs to determine hidden, deep nested dynamic and static relationships between events and entities in the structured metadata of the incoming data and structured metadata in the database. In some embodiments, the collected data comprises at least one of numeric data and binary data. In other embodiments, the collected data comprises at least one of imagery data, natural language text, observation data and categorical data.

In some embodiments, the super-object comprises a vertex and a plurality of edges, each edge representing a correlation between at least one of different entities, entities and events, and different events in the structured metadata and the vertex of the super-object having the most edges in the super-object. In some embodiments, the distributed analysis engine generates super-objects by identifying relationships among attributes of different entities, determining the strength of the identified relationships, and generating super-objects for reporting and display.

In some embodiments, the distributed analysis engine compares a portion of the structured metadata in the database with the structured metadata of the incoming data and sequentially compares other portions of the structured metadata in the database with the structured metadata of the incoming data. In other embodiments, the portions of the structured metadata in the database are random portions of the data that are less than 30% of the structured metadata in the database.

In some embodiments, the distributed analysis engine conditions the incoming data to fill in missing values within a context before parsing the incoming data into metadata. In embodiments, the distributed analysis engine determines the strength of the identified relationships using statistical methods to obtain a distribution function for one or more correlation IDs.

In some embodiments of the system of the present invention, at least some of the past activities are selected from the group consisting of social network activities, criminal activities, terrorist activities, IED activities, computer network activities, and financial activities, and the predicted future activity is an activity of the same type.

According to a third aspect of the present invention, there is provided a method of evaluating data and analysis of past activities and prediction of future activity, the method comprising entering into a database on at least one computer a plurality of entity types, each entity type comprising a sequence of at least one character, entering into a database a plurality of entity values, each entity value being indexed to one of the entity types, entering into a database a plurality of attribute types, each attribute type comprising a sequence of at least one character, entering into a database a plurality of attribute values, each attribute value being indexed to one attribute type and comprising a sequence of at least one character, entering into a database at least one event, each event comprising at least two values selected from the group consisting of said entity values and said attribute values, and entering into a database at least one correlation ID, each correlation ID being a user defined attribute relationship linking an attribute type of one of said entity values to an attribute type of at least another of said entity values. The method further comprising collecting data from a plurality of sources using a distributed system of networked computers, the distributed system of networked computers comprising a plurality of levels each having at least one personal computer, wherein an entry level of the plurality of levels further comprises at least one personal digital assistant or hand held computer, parsing incoming data in the database front-end into structured metadata comprising one or more of entities, attributes, events and correlation IDs, correlating the structured metadata of the incoming data with structured metadata in the database and determining micro-patterns in the structured metadata using said distributed analysis engine by associating at least two of entities and events to form a super-object, the super-object having a vertex and at least one edge value, wherein the vertex of the super-object is the one having the most edges in the super-object, and each edge value relates entities and events having an attribute type and attribute value in common that equals or exceeds a threshold edge value, and predicting future activity from the super-object representing the determined micro-patterns in the structured metadata.

In some embodiments, the method further comprises displaying the super-object to a user as a graphical representation of a composite network of determined micro-patterns in the structured metadata between events and entities. In these embodiments, at least some of the past activities are selected from the group consisting of social network activities, criminal activities, terrorist activities, IED activities, computer network activities, and financial activities, and the predicted future activity is an activity of the same type.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

The system and method of the present invention predicts future activities using a distributed analysis engine to parse incoming data into structured data including entities, events, attributes and correlation IDs and determine deep nested and hidden relationships in the structured data. The present invention identifies deep nested and hidden relationships in the data by using a distributed analysis engine to perform multilayer, multidimensional, indirect correlation in the data and predict future activities.

The present invention provides an automated method of finding such correlations in complex data sets and predicting future events based on observations and activity of the identified relationships. It is the novel application of proven multivariate predictive methods to the relationship layer that differentiates the present invention from known predictive methods.

The present invention includes a database, a distributed system of networked computers for collecting and managing data and a distributed analysis engine. The distributed system of networked computers includes handheld devices, such as PDAs, personal computers, laptops and main frame computers. The distributed analysis engine is software-based. In one embodiment, the distributed analysis engine of the present invention includes a secure dissemination framework for inputs and outputs.

The system of the present invention comprises multiple software modules that are designed to run on multiple computing platforms. In one embodiment, the system code has been compiled to run on the Linux operating system (specifically the Fedora Core 6 64-bit operating system). In another embodiment, the system code has been compiled to run on Microsoft Windows operating system (2 GB RAM minimum). In one embodiment, the graphical user interfaces have been developed using Java applets and can be accessed through a Web browser. All host computers are assumed to be interconnected via an IP network. The multiple software modules of the present invention is designed to enable different software implementations on different computing host platforms.

Figure 1:
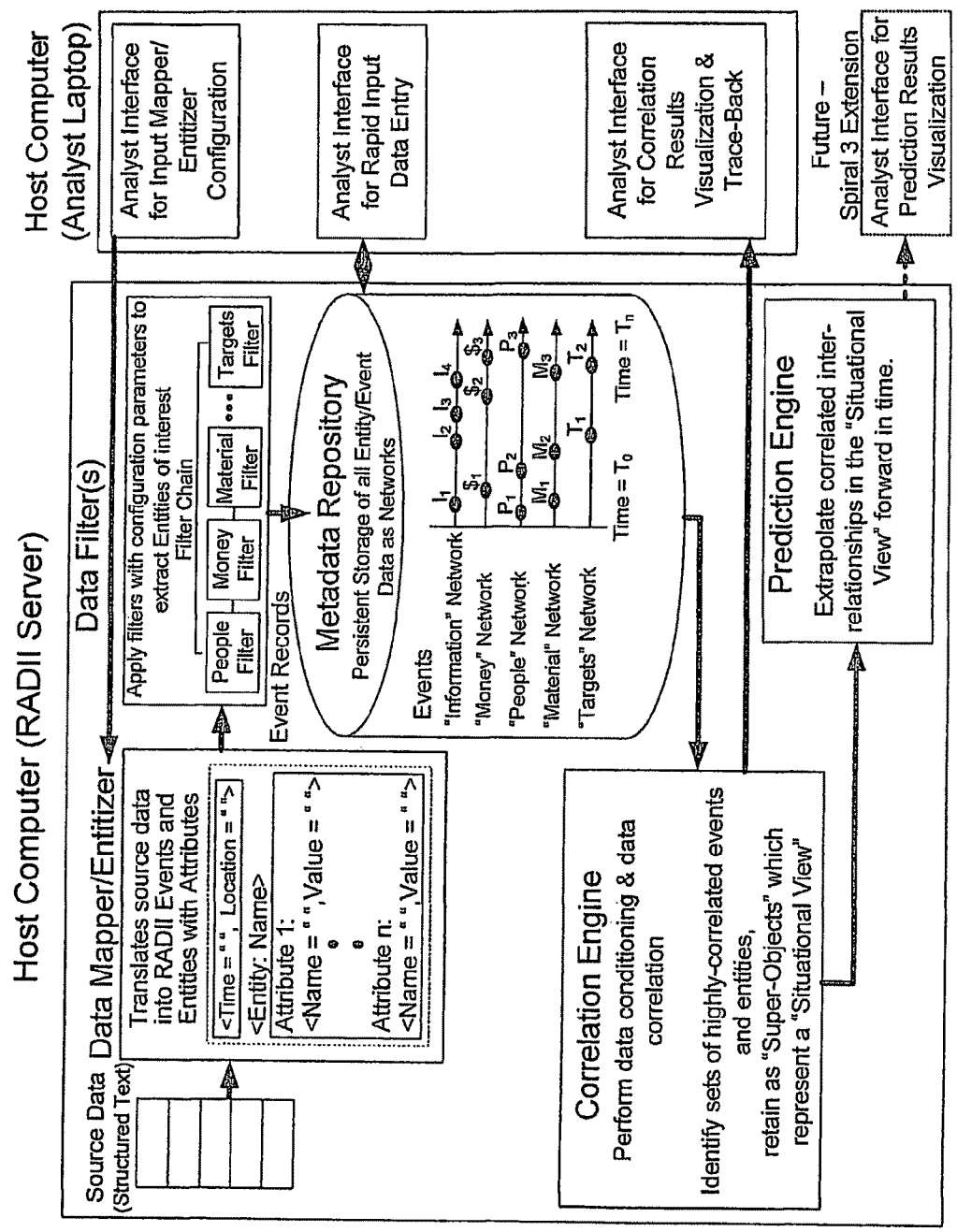
FIG. 1 illustrates the hardware configuration of one embodiment of the present invention.

In one embodiment, the software modules include a data mapper/entitizer (hereinafter data mapper), data filters, metadata repository, and the distributed analysis engine are all on one computer host platform, with one or more remote analyst computers which run the graphical user interfaces for the data mapper and data filter configuration, a rapid data entry tool, and the correlation results display interface, as shown in FIG. 1. In embodiments of the present invention, there can be multiple user clients, each running their own instance of the user interfaces. In another embodiment, the data mapper, data filters, metadata repository, and the distributed analysis engine are on multiple computer host platforms.

The present invention performs data correlation to continuously generate situational relationship information from disparate data sources and predict future events or activities. While the present invention is designed to operate on structured data, the framework also enables the integration of systems that provide structured outputs from unstructured data (imagery, natural language text, etc.). The system of the present invention is flexible and can also be configured to operate upon general-purpose predictive analysis problems.

The time and content accuracy of the data that is collected is critical to the complex operations performed by the present invention. Often the initial collected data will be inaccurate, incomplete, dirty, or have questionable reliability, but as data is refined and new information becomes available the quality of the original collected data can be verified as accurate and improved, but only if the updates to the collected data are distributed by the present invention to users in a timely manner. The present invention provides an innovative mechanism for the real-time synchronization, consolidation and state maintenance across the distributed system of networked computers to exploit later improvements to the collected data and prediction results.

In the present invention, the database includes a database front-end that comprises a configurable processor that is configured to parse incoming collected data. A user of the present invention, such as a data analyst, configures the database front-end by defining a plurality of entities, events, attributes and correlation IDs. Each entity is defined to include one or more attributes, each event is defined to include one or more attributes, and each correlation ID is a user defined attribute relationship that correlates one or more events and entities in the database.

The present invention performs multilayer, multidimensional, indirect correlation using a specified suite of algorithms that outputs predictions of future activities and events. The present invention's output of future predicted activities is actionable information that can be used to disrupt the planning and execution cycle of another party as early as possible to minimize the successful execution of the predicted event, such as an attack.

The present invention has very specific meanings for the following terms and concepts, which will be further discussed, along with detailed examples, in the remainder of this disclosure.

Figure 2:
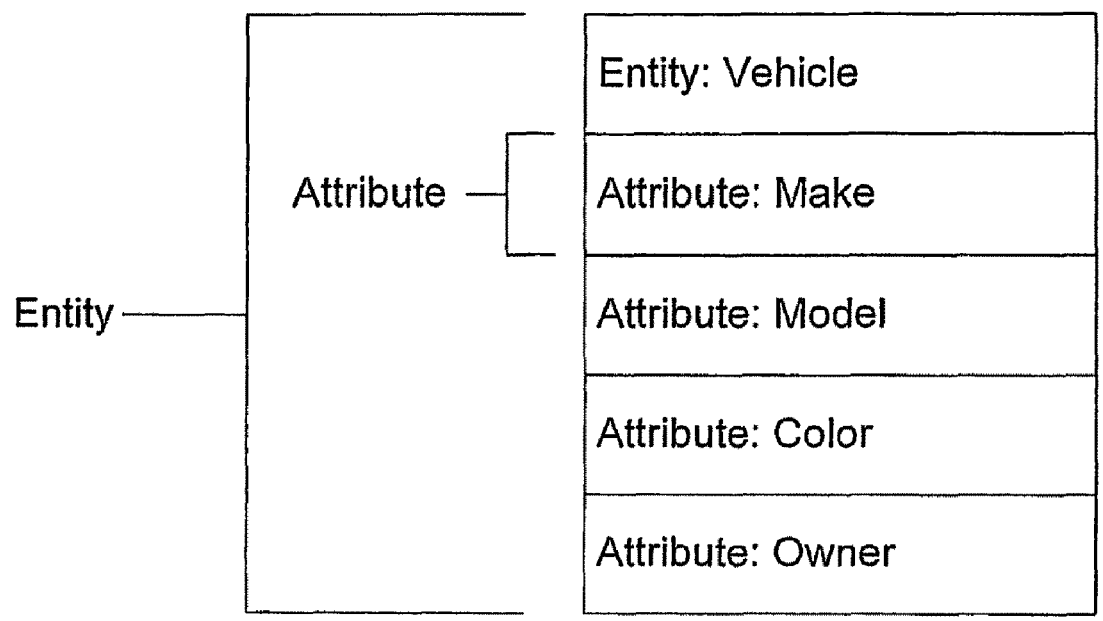
FIG. 2 shows an example of a vehicle entity with multiple defined attributes in one embodiment of the present invention.

Entity—An entity is composed of attributes which specify data an analyst wants the present invention to collect about the entity. An example of a vehicle entity with multiple defined attributes is shown in FIG. 2. When an analyst is configuring the present invention with the information that is to be collected, the analyst defines each entity and the attributes associated with each entity. An entity may be anything from a physical thing (person, vehicle, etc.) to a situation (explosion, etc).

Figure 3:
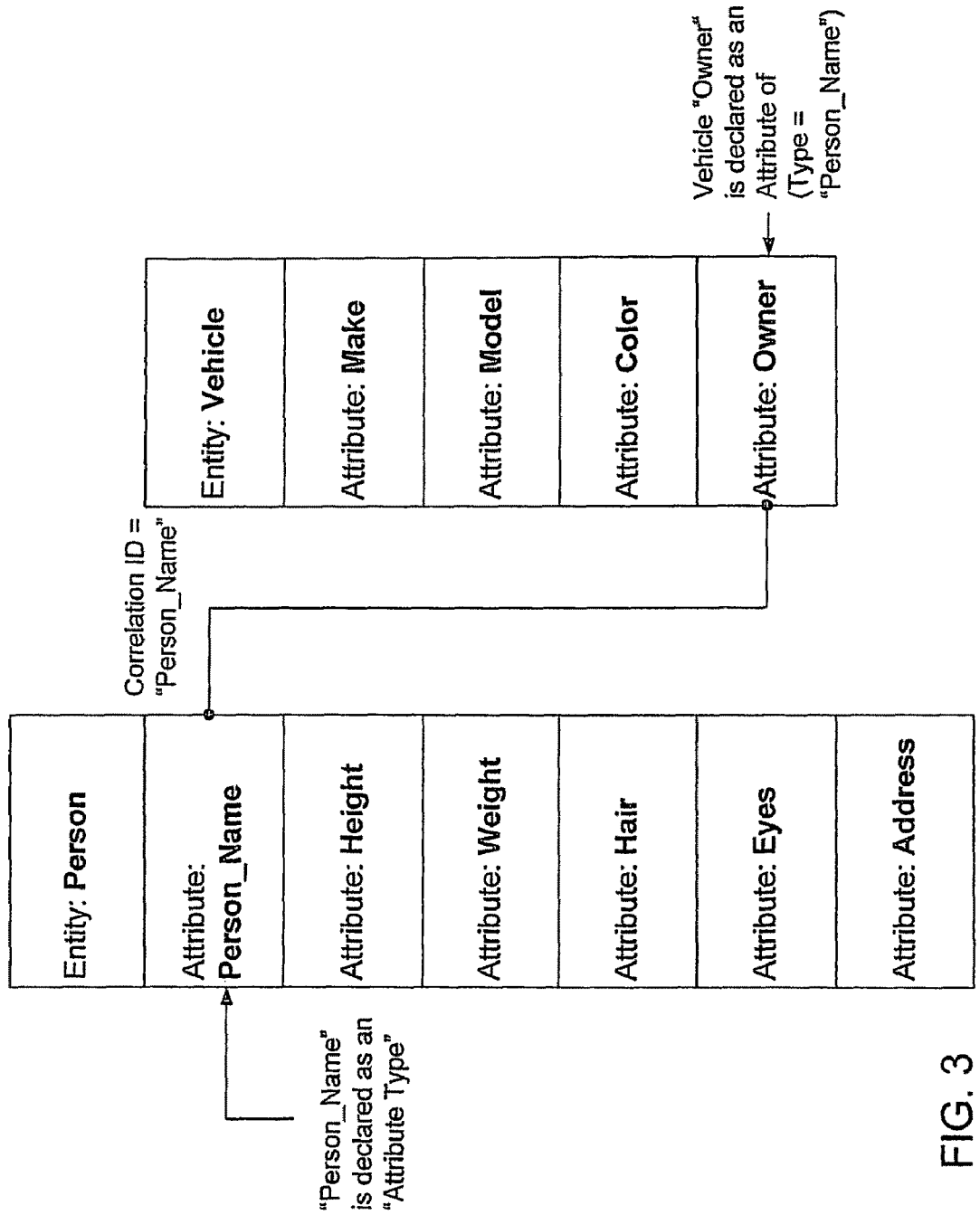
FIG. 3 illustrates an example of an attribute type, or correlation ID one embodiment of the present invention.

Attribute—attribute is a specific piece of data that is associated with at least one entity. Analysts define all of the attributes of interest that comprise each entity. Additionally, the analyst also specifies which attributes to declare as an attribute type, or correlation ID, as shown in FIG. 3. This is another way of saying that the analyst specifies which attributes of one entity will map to another attribute included in other entities, regardless of the label associated with the attribute. The present invention can automatically compare the values of the actual data for the correlation IDs between each entity, and automatically correlate the data by discovering all the relationships that exist across all relevant data. In the present invention, correlation IDs are the basis for generating auto-correlations. The present invention includes a configuration interface that simplifies the declaration of attributes through a drop-down list of any attribute types that may have been pre-defined. The configuration interface also enables the analyst to declare an attribute as a "Correlation ID". In the example shown in FIG. 3, the analyst defines a "person" entity with an attribute of a "person_name," and defines that the "person_name" attribute is a correlation ID. The analyst also defines a "vehicle" entity with an attribute of "owner" and defines the "owner" attribute of the "vehicle" entity is an attribute of "person_name" correlation ID. The distributed analysis engine of the present invention then correlates the vehicle "owner" attribute and "person_name" attribute across all person entities and vehicle entities.

Figure 4:
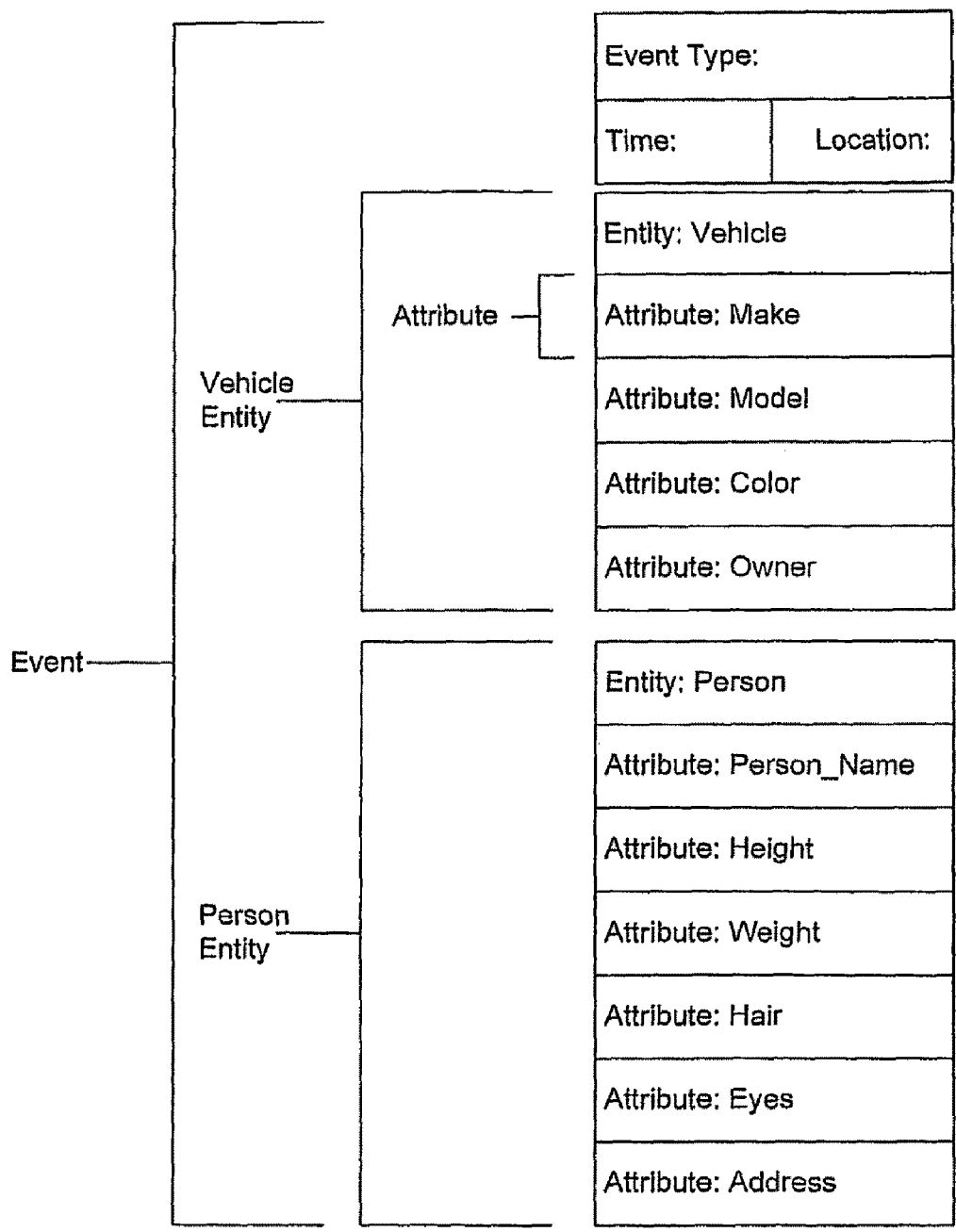
FIG. 4 illustrates an example of an event including a time reference and geospatial location reference with one or more entities attached in one embodiment of the present invention.

Event—An event has a time reference plus an optional geospatial location reference, to which one or more Entities may be attached. The "name" or "label" given to events in the present invention are either assigned by the analyst or extracted directly from an incoming structured data type. For example, an "explosion" event associated with a Time "t" and location "L" may be the "event" label that the present invention extracts from an incoming report. One or more entities may be associated with the same event, time and location reference, as illustrated in FIG. 4, which shows an event with time and location reference having two associated entities.

Micro-Pattern—A micro-pattern captures the behavior of micro-level relationships that are discovered during correlation processing.

Figure 5:
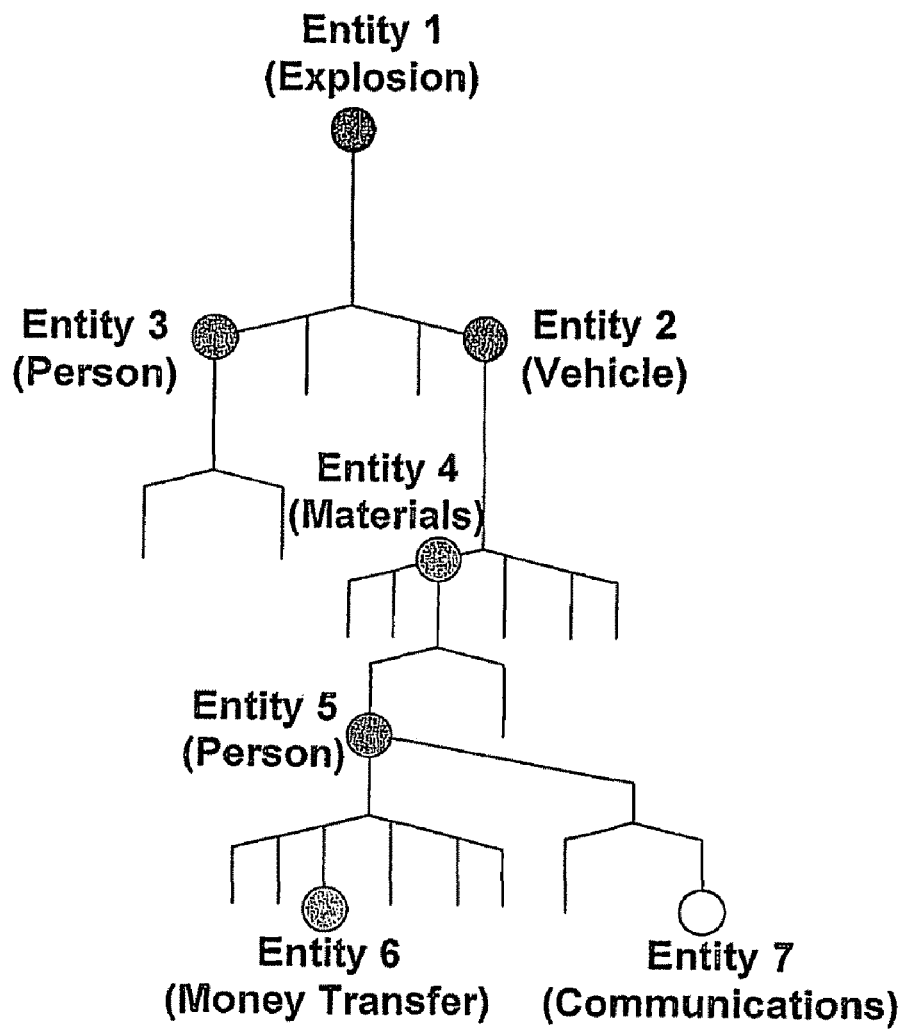
FIG. 5 illustrates an example of a super-object in one embodiment of the present invention.

Super-object—A super-object is an output generated by the present invention for the analyst. The present invention may generate multiple Super-Objects, or no super-objects, depending on how many different correlations have been generated by the distributed analysis engine during the analysis based on correlation IDs in common among different entities. In addition to being able to correlate based on Correlation IDs, the present invention also correlates entities that are part of an event. As illustrated in FIG. 5, a super-object is a tree-like structure that contains all of the correlated entities that the distributed analysis engine discovered during data correlation processing, including associated events having a time and location reference. In FIG. 4, the "base" of the tree has an "Explosion" entity. The present invention determines during the auto-correlation processing that the explosion entity was the base of the super-object shown in FIG. 5, because the explosion entity was the "vertex" that has the most related "edges" in the super-object. After super-objects are generated, in one embodiment of the present invention, the analyst can view them as a tree-structure, or choose to have the all entities displayed on a geographic map.

The present invention does not create patterns or templates to be populated with data to develop an awareness of the phenomenon. Instead, the present invention operates on micro-patterns and provides awareness of discovered relationships through composite network visualization. The micro-patterns are generated on the simplest two-node pattern. Prediction of future events in the present invention is calculated by predicting activity of these two node patterns.

The sheer volume and detail of the micro-patterns makes it difficult to present them individually in a meaningful manner to a user/analyst. To address the need for human comprehension, one embodiment of the present invention provides a network analysis GUI which enables the analyst/user to view the super-objects and manipulate the display to present the underlying patterns in a human comprehensible format. The super-objects provide a higher level awareness and enable the user to drill down into the super-object to better understand the details without overloading the analyst/user.

The advantage of the micro-pattern operations over physical models or systems that rely on larger patterns for operation is that the prediction capabilities of the system and method of the present invention is not fooled by an event that occurs out of sequence, such as a change to tactics used previously, or by an act of deception.

Figure 6:
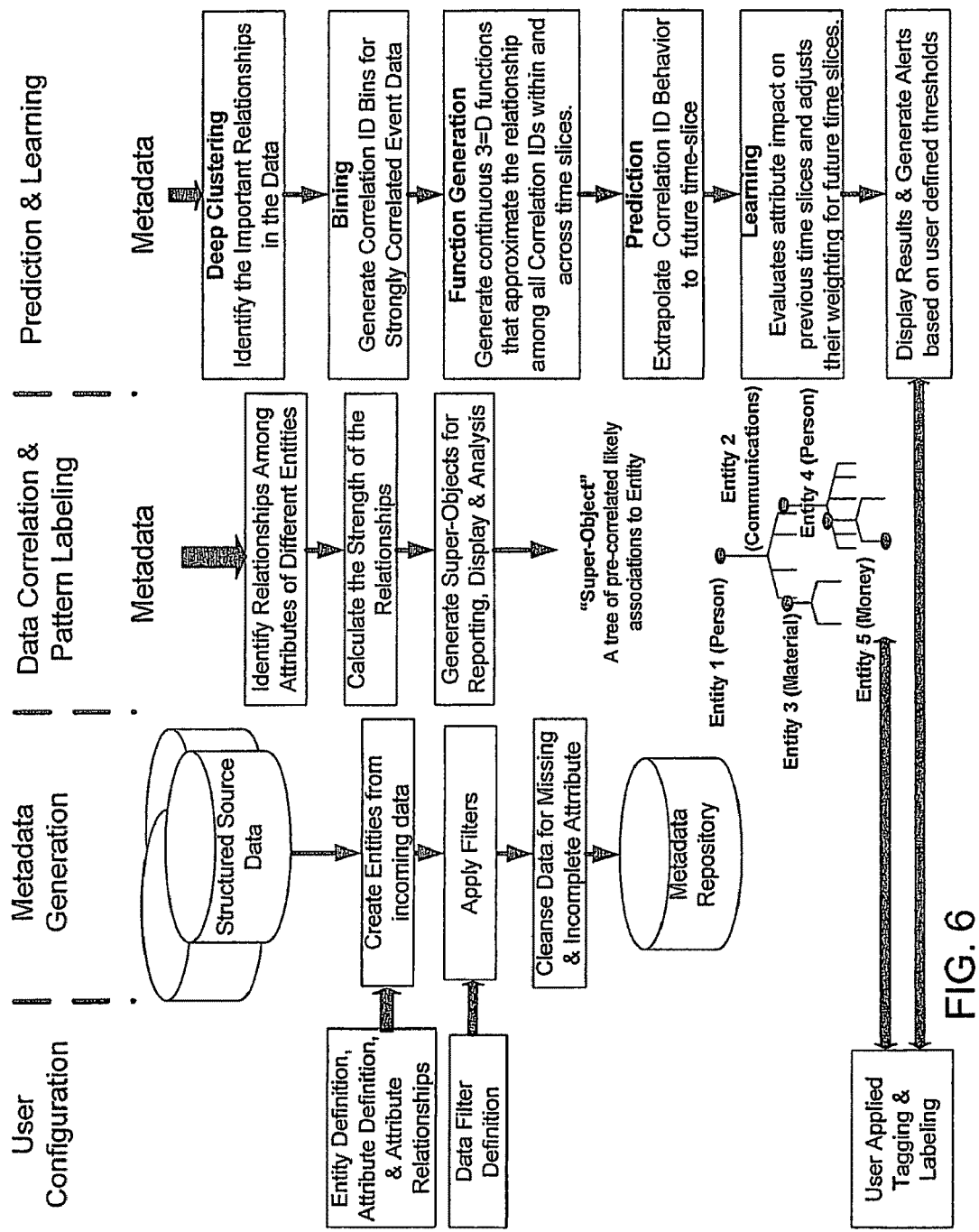
FIG. 6 shows the flow of functional processing in one embodiment of the present invention.

The flow of functional processing in one embodiment of the present invention is shown in FIG. 6. In this embodiment, the flow of functional processing is broken down into six major components: (1) configuration, (2) generating metadata, (3) data conditioning, (4) data correlation and reduction, (5) prediction, and (6) learning.

Prior to applying the distributed analysis engine, the analyst must configure the front-end of the system to parse the incoming collected data, and if desired, filter the incoming collected source data so that for any one or more specific attributes of an entity, only the desired value or range of values are included in the data correlation processing and analysis (e.g. the analyst is only concerned with financial transfers of over $10,000).

In one embodiment, the present invention includes three graphical user interfaces (GUIs) for the analyst to configure the "front-end" of the system, which processes incoming collected source data. The data mapper GUI configures the system for the type of analysis problem. The data mapper also includes functionality to translate the collected source data to the defined standard processing objects of the present invention (i.e.—events, entities, and attributes). The filter definition GUI creates and edits data filters and filter chains that will be applied to collected source data.

After collected source data has been processed by the data mapper and translated to the standard processing objects, the objects are processed by the user defined data filters and stored in a metadata repository in the present invention prior to entering the data correlation and prediction engines of the present invention. The metadata generated by the data mapper includes all events and entities, including their associated attributes that are found in the collected source data (e.g., input data). The metadata output of the data mapper that successfully passes through the user defined data filters is what is stored in the metadata repository. In one embodiment, the metadata repository is a persistent store for the output of the data mapper and data filter(s) and a PostgreSQL database is used to persist the metadata.

In the data conditioning processing shown in FIG. 6, the present invention performs a data conditioning/cleansing operation to fill in missing values within a context.

In the data correlation and reduction processing, the distributed analysis engine performs correlation processing and analysis on the event and entity metadata, and systematically "discovers" all correlations that are present between different entities in the metadata. One embodiment of the present invention utilizes an innovative approach for automated mathematical data correlation and reduction that consists of the following steps:

1. identification of relationships among attributes of different entities;
2. calculation of the strength of the relationships; and
3. generation of super-objects for reporting and display.

Figure 7:
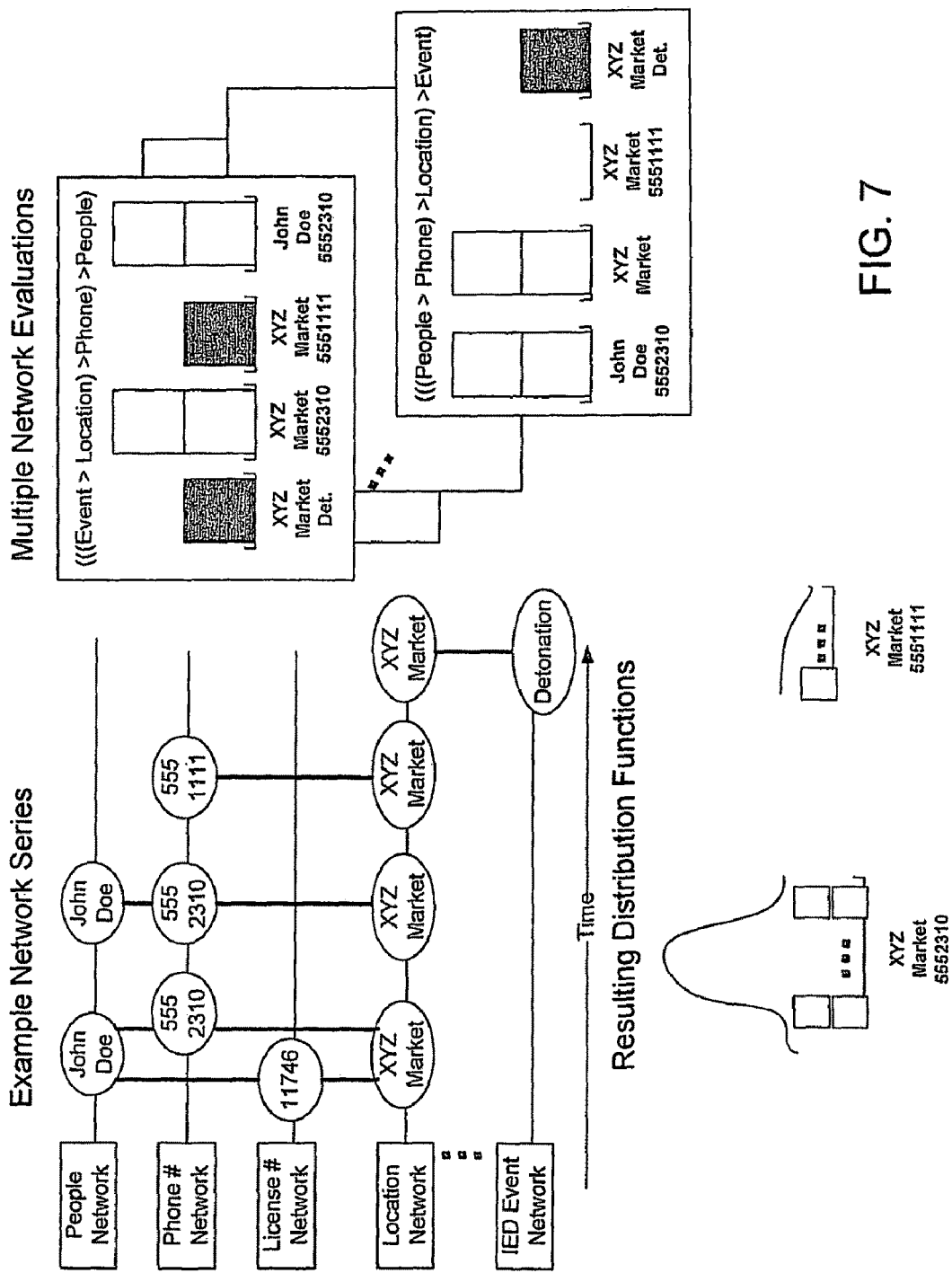
FIG. 7 illustrates an example of a simple network series identifying relationships in one embodiment of the present invention.

To identify all of the relationships in the collected source data, the present invention compares the values of all of the attributes of a certain attribute type (i.e., correlation ID) across all of the entities and events. The result is series of networks for the relevant entity types (i.e. people, vehicles, financial transactions). The networks are connected through a series of correlation functions defined by correlation IDs to create a complete "situational understanding" for a user/analyst. An example of a simple network series is shown in FIG. 7.

To mathematically determine an appropriate weight to apply to the identified correlations as a function of time, space, and data content, the distributed analysis engine determines the strength of the relationship and the distance of the relationship for specific correlation ID's. The distributed analysis engine evaluates the correlations from multiple perspectives to obtain a distribution function for that correlation ID. FIG. 7 shows two possible evaluation results by processing the network series from the bottom-up and from the top-down. A distribution for a particular correlation ID is then generated from the results. FIG. 7 illustrates how a phone number (555-2310) is an important relationship in establishing a relationship between a person, John Doe, and the detonation of an IED at a location, XYZ market. The phone number (555-1111), while associated with the market, can not be strongly connected to the person, John Doe in FIG. 7.

The correlation processing of the present invention uses statistical methods for "multivariate outliner detection" to determine the strength of the relationship and relevance to the overall correlation result. Outliner detection indicates those observations that are located relatively far from the center of the data distribution. In this case by calculating a distance measure at the peaks of the distribution curves. One embodiment of the present invention uses the "Mahalanobis" distance, which given "n" observations from a p-dimensional dataset will denote the sample mean vector and the sample covariance matrix. To prevent the correlation processing from underestimating the importance of a low occurrence entity in the collected source data, the present invention employs a ranking process for identifying nodes of high importance. The ranking process ensures that important entities having sparse activity contribute more to the strength of the correlation than low importance entities having more occurrences in the collected source data.

In real-world applications, the networks created during correlation processing are generated at an atomic level, such that the number and complexity of the network sequence become difficult to mange for both the system and user. To mitigate this issue, the correlation process of the present invention continuously creates vertices and weighted edges on the network sequences and then iteratively "pancakes" (i.e.—collapses) the networks. An example illustrating the iterative "pancaking" process performed between different network layers to collapse correlations down to a correlated network sequence, or "super-object", is shown in FIG. 8.

Figure 8:
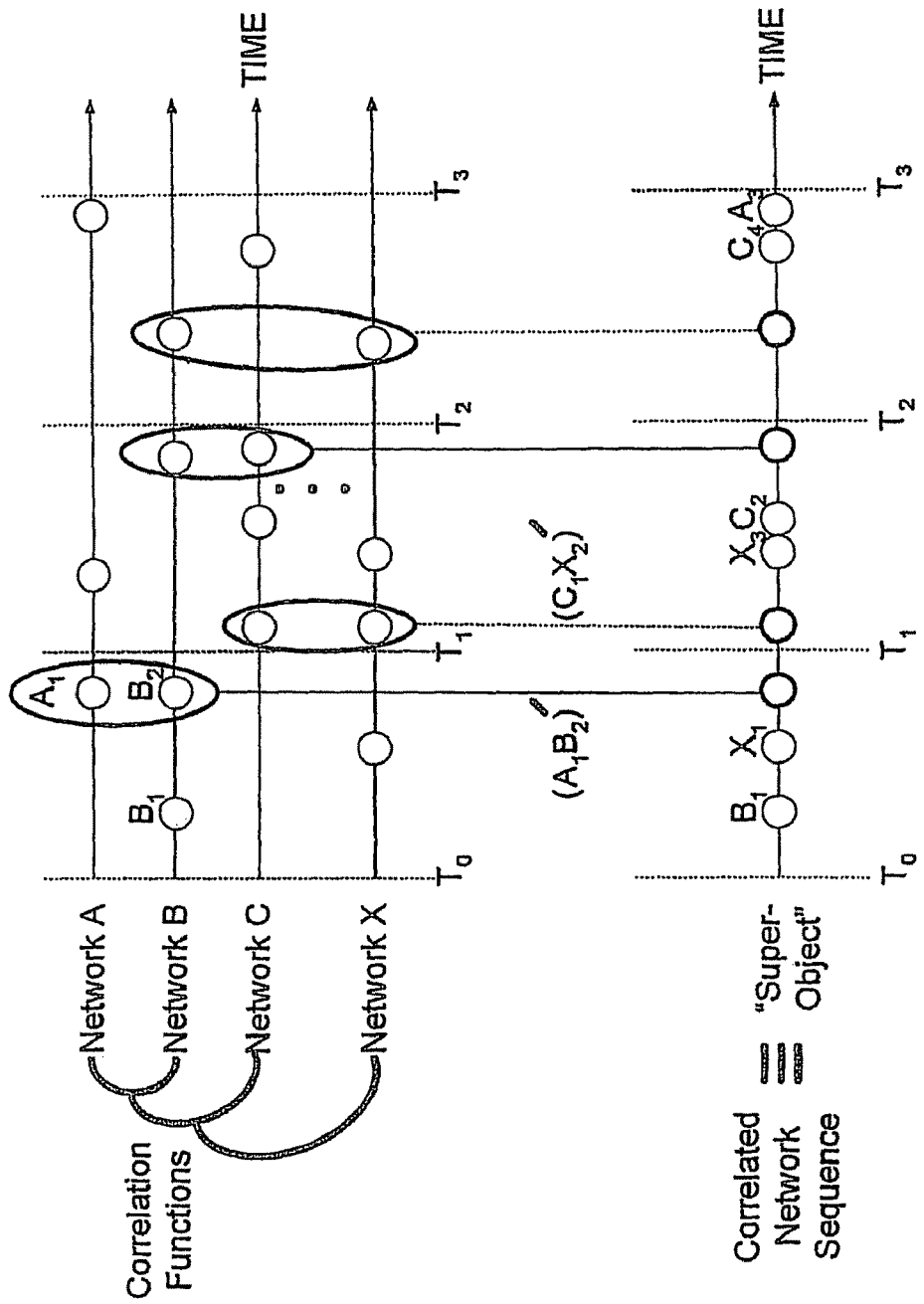
FIG. 8 illustrates an example of the "pancaking" process performed to collapse correlations down to a super-object in one embodiment of the present invention.

While the super-object shown in FIG. 8 simplifies the representation of the processed data, it is important to understand that the correlation IDs and metadata are retained in the metadata repository to provide a drill down capability for the user in the presentation of the results and to facilitate future processing when new collected source data is received.

Figure 9:
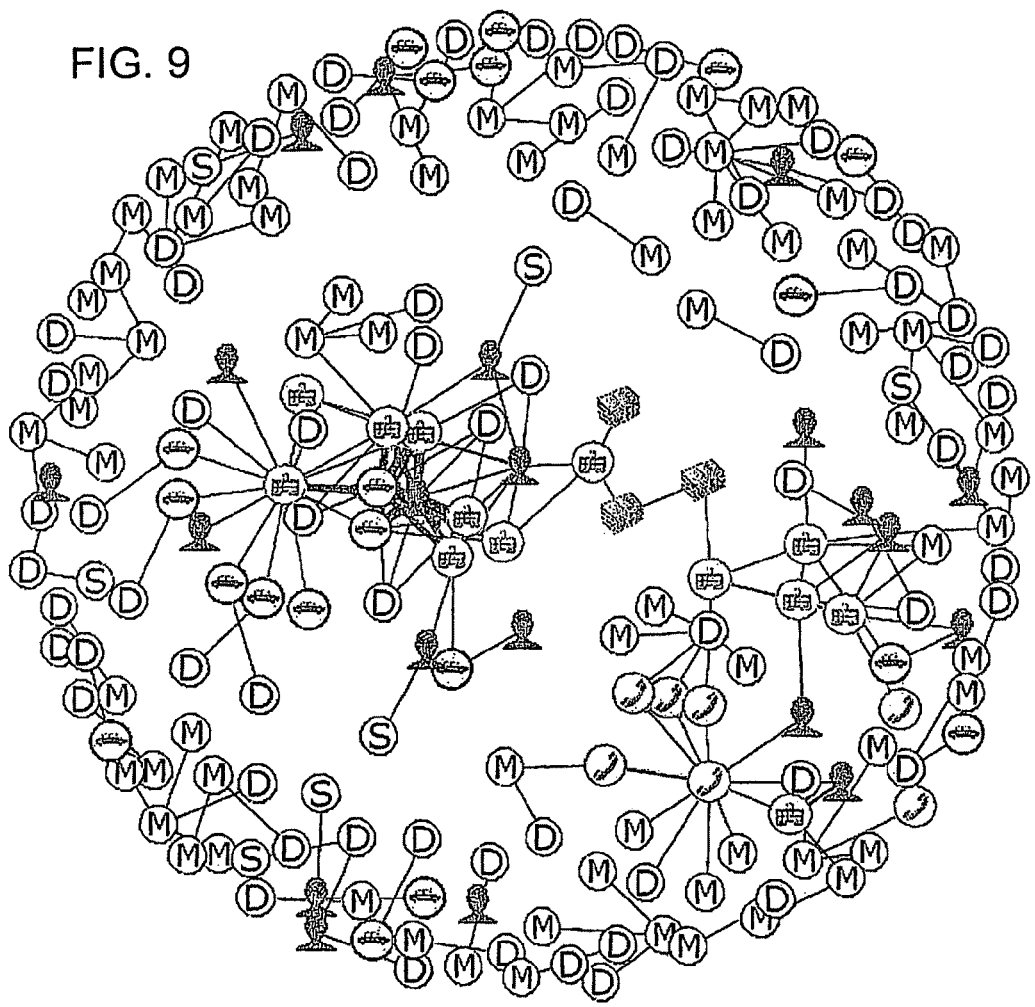
FIG. 9 depicts a nodal view to a user that presents all correlated entities and their relationships in one embodiment of the present invention.
Figure 10:
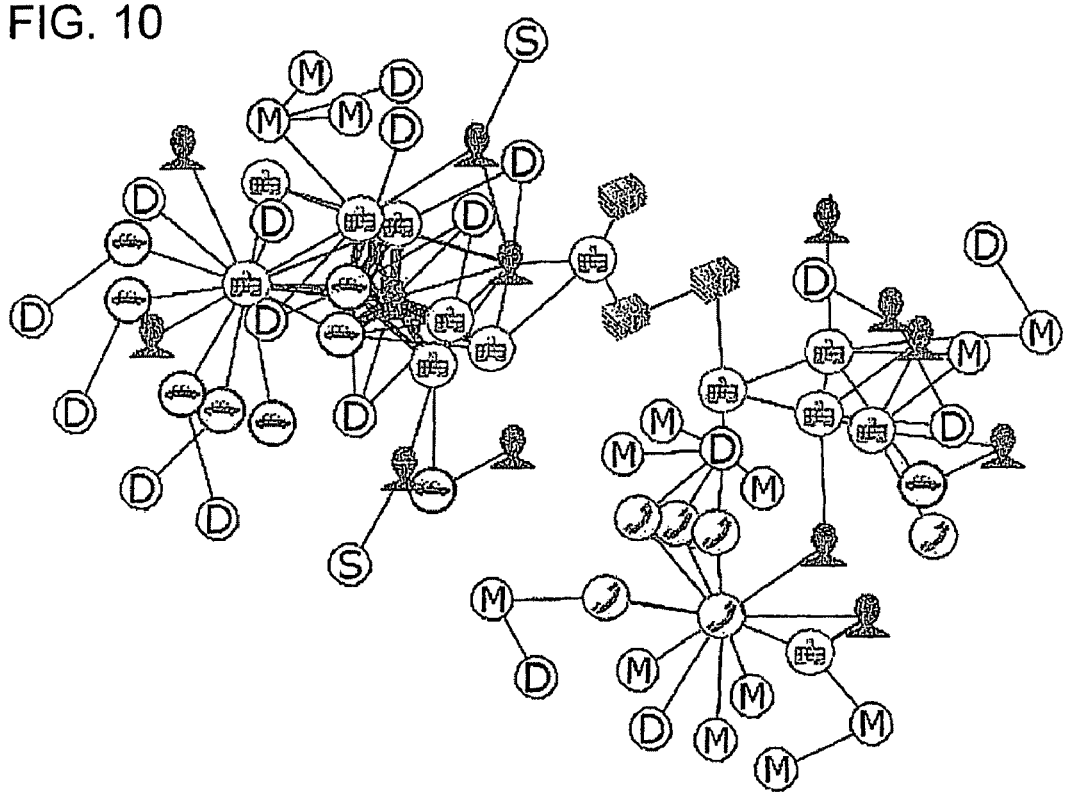
FIG. 10 illustrates an example of emphasizing patterns of interest through user selection of filters and time slices in one embodiment of the present invention.
Figure 11:
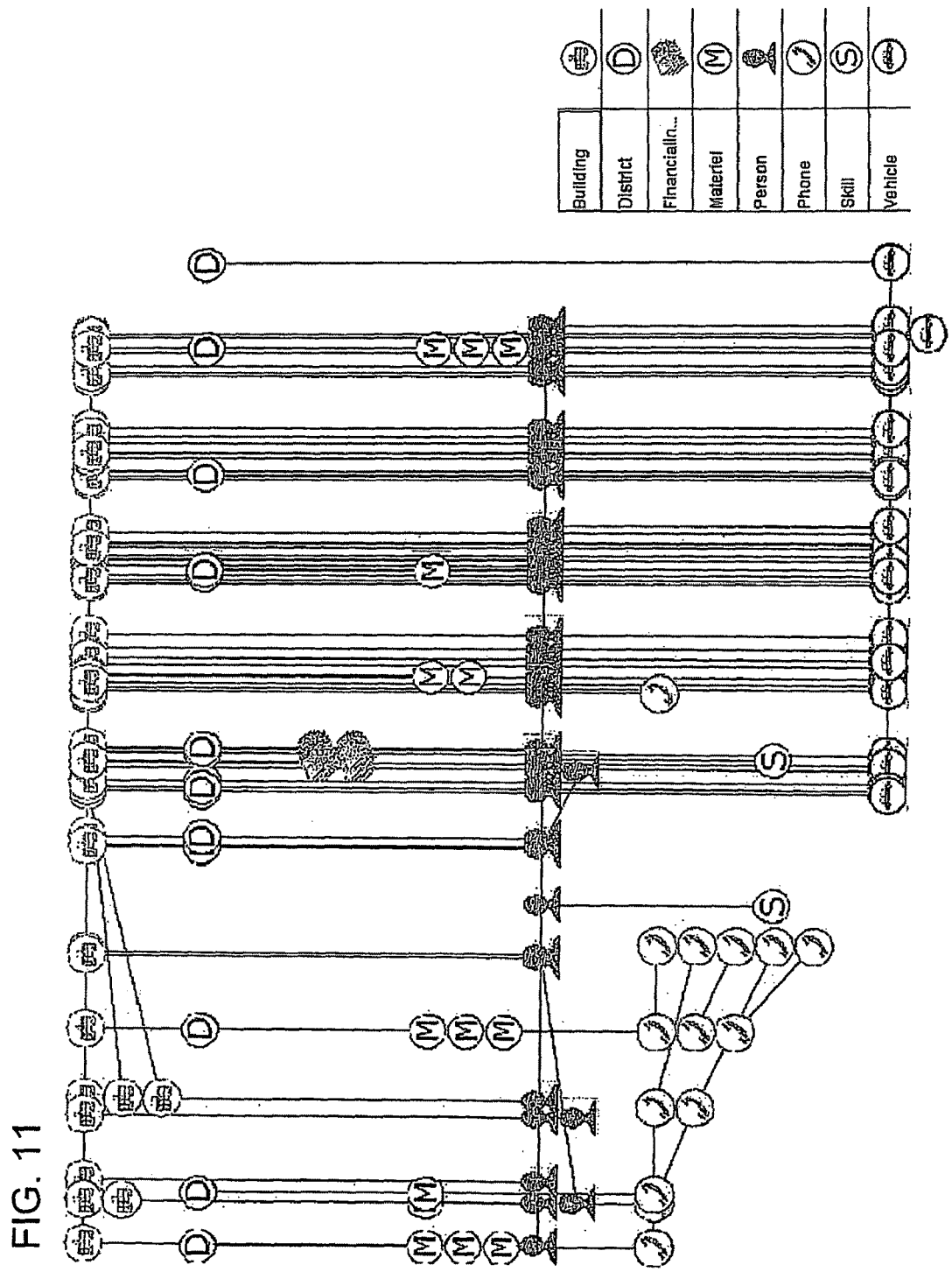
FIG. 11 shows an example of a time series view that enables the user to view the evolution of the network over time in one embodiment of the present invention.
Figure 12:
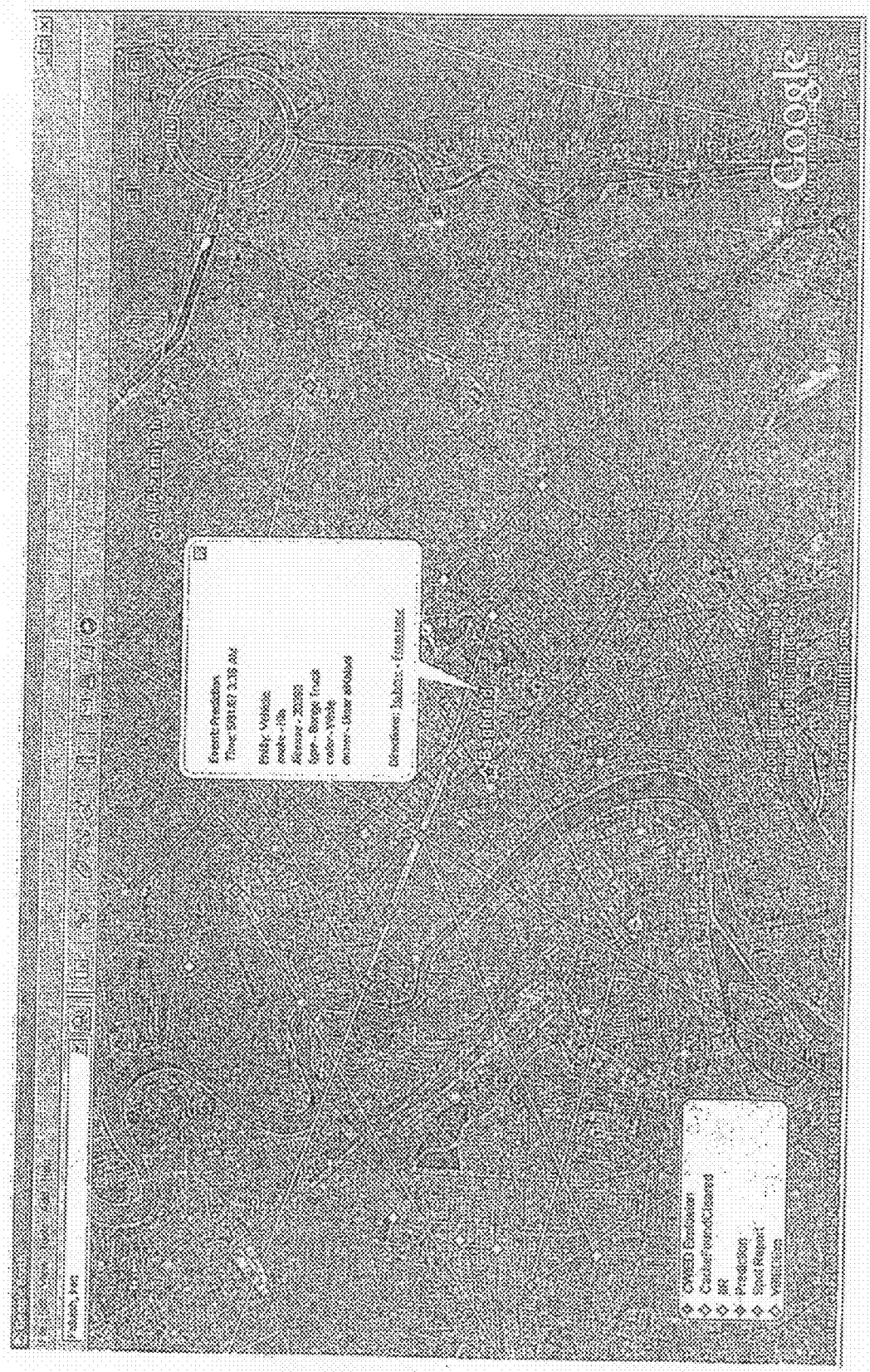
FIG. 12 illustrates an example of a geospatial map view that displays the results according to their geo-location in one embodiment of the present invention.

The results of the correlation processing are presented to a user though a GUI. In one embodiment, the GUI includes three core graphic displays supported by tabular displays. The three core graphic include:

a nodal graph view—the nodal view, which is shown in FIG. 9, presents all correlated entities and their relationships. The GUI provides the capability to filter out entities and sub-networks, search for entities, drill-down to view the details of the entities and correlations, and to display the nodal view in a time series. Patterns of interest can be emphasized through user selection of filters and time slices, as shown in FIG. 10.

a time series view—the time series view enables the user to view the evolution of the network over time, as shown in FIG. 11. A slide bar, allows the user to manipulate start and stop times, as well as the time window. The filtering, search, and drill-down capabilities are also available in this view to analyze the patterns of interest.

a geospatial map view—the geospatial map view displays the results according to their geo-location, as shown in FIG. 12. Time series capabilities, filtering, search, and drill down-capability are also available in this view to analyze the patterns of interest.

The distributed analysis engine of the present invention applies a prediction algorithm to the relationships between entities as a function over time. Using past and present collected source data, the prediction algorithm dynamically generates estimated "future data", along with associated error margins, specifically pertaining to the magnitude of correlation IDs in precisely defined future time windows (referred to hereafter as "time slices").

A prerequisite to generating valid future predictions is that there is an adequate volume of inter-related input collected source data to generate a sufficient number correlation IDs within each time-slice in an analysis. What is a sufficient number correlation IDs within each time-slice depends upon the nature of the domain to which the algorithm is applied.

In one embodiment, the distributed analysis engine employs a prediction algorithm which is decomposed into the following sequential steps:

Important relationships identification—From the set of super-objects generated during the correlation process, the prediction algorithm then determines the relevant set of important relationships from the collected source data using a deep clustering process.

Correlation ID bin generation for event data—From the set of identified important relationships the prediction algorithm generates time dependent correlation ID bins that contain occurrences of specific attributes from the event data.

Function generation—From the generated correlation ID bins, the prediction algorithm generates a continuous 3-D function that approximates the relationship between all the correlation ID bins in that time slice. This process involves the development of functions to predict an individual bin's behavior, and the interdependent behavior of multiple bins.

Prediction generation—From the generated functions, the prediction algorithm predicts the magnitude of the next correlation ID bins in a future time-slice, based on the current correlation ID bins.

Alert generation—Based on the generated predictions, the prediction algorithm generates alerts, alarms, and recommendations, based on thresholds defined by the user.

Display generation—The distributed analysis engine generates a graphical depiction of the prediction results. In one embodiment, the present invention uses a graphical user interface, the predictive engine results display graphical user interface, to enable users to view prediction results.

The following paragraphs provide more detail on the theory behind the prediction algorithm of the present invention, and relate that theory to the steps listed above.

As previously disclosed, the distributed analysis engine of the present invention applies a prediction algorithm to the relationships between entities, defined as correlation IDs, as a function over time. To facilitate this application of the predictive algorithm to relationships, the distributed analysis engine creates software containers called "correlation ID bins." The correlation ID bins are generated only for entities that have been determined to be correlated during the deep clustering process. The deep clustering process determines the strength of the relationships determined during deep clustering as a function of the attribute types and the distribution functions. At least the following methods are included in the deep clustering process:

Minkowski distance for numeric attributes;
Distance measure for binary and nominal attributes;
Extended Jaccard for similarity; and
Dice Coefficient for similarity.

Figure 13A:
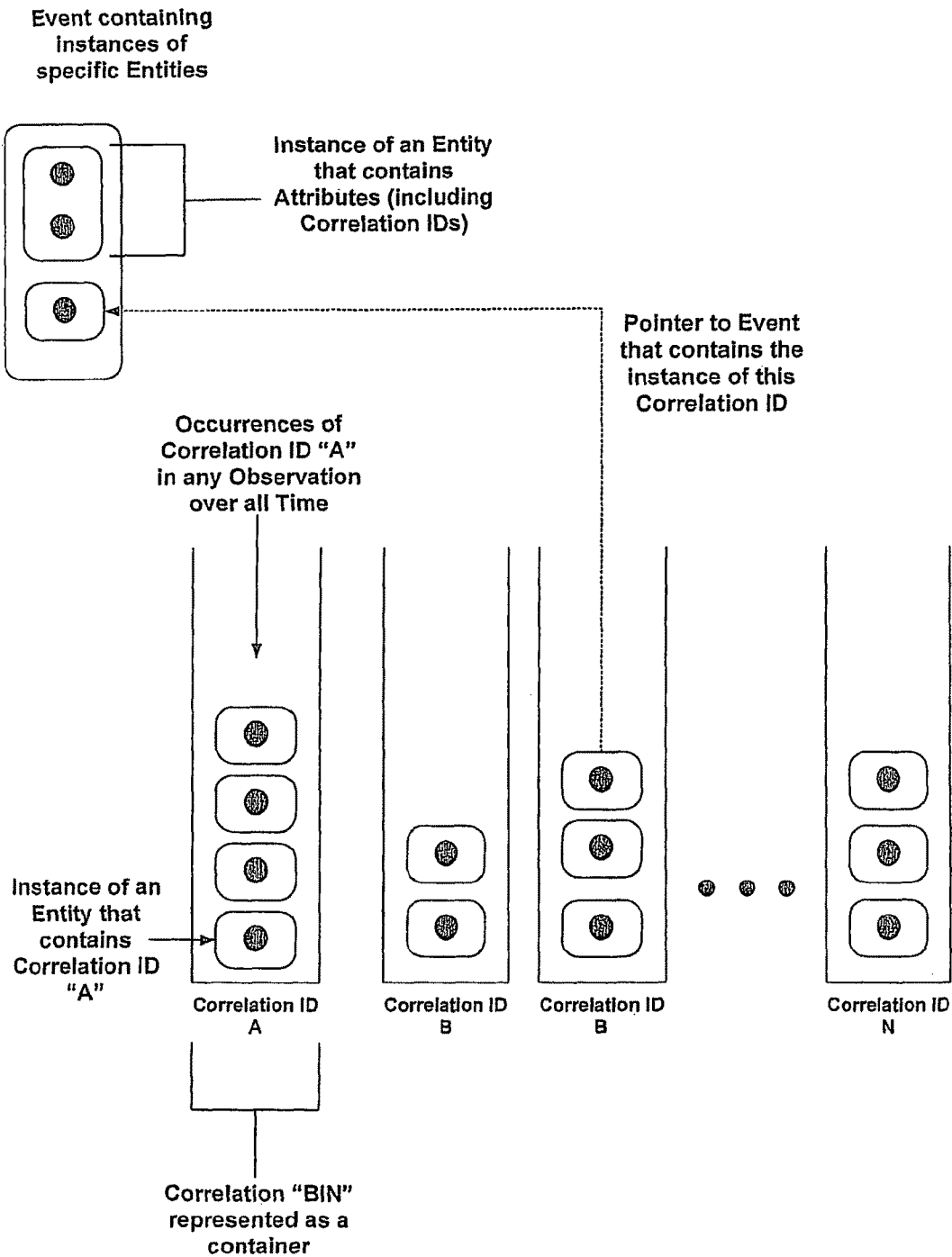
FIG. 13(a) illustrates a conceptual view of a correlation ID bins in one embodiment of the present invention.

Once the strength of the dependencies among entities has been determined, software containers for correlation IDs of a single type are created (i.e., time dependent correlation ID bins). Correlation ID bins (hereafter referred to simply as "bins") are illustrated conceptually in FIG. 13(a). A correlation ID bin points to entities that the correlation ID "belongs to", and also to the parent event via the relationship of the entity to its parent event.

In the present invention, the overall flow of operations upon incoming collected source data is to perform consolidation with embedded filtering and correlation. Every time the distributed analysis engine processes incoming collected source data, new elements of the same type of correlation ID are added to the bin, along with their associated time.

Figure 13B:
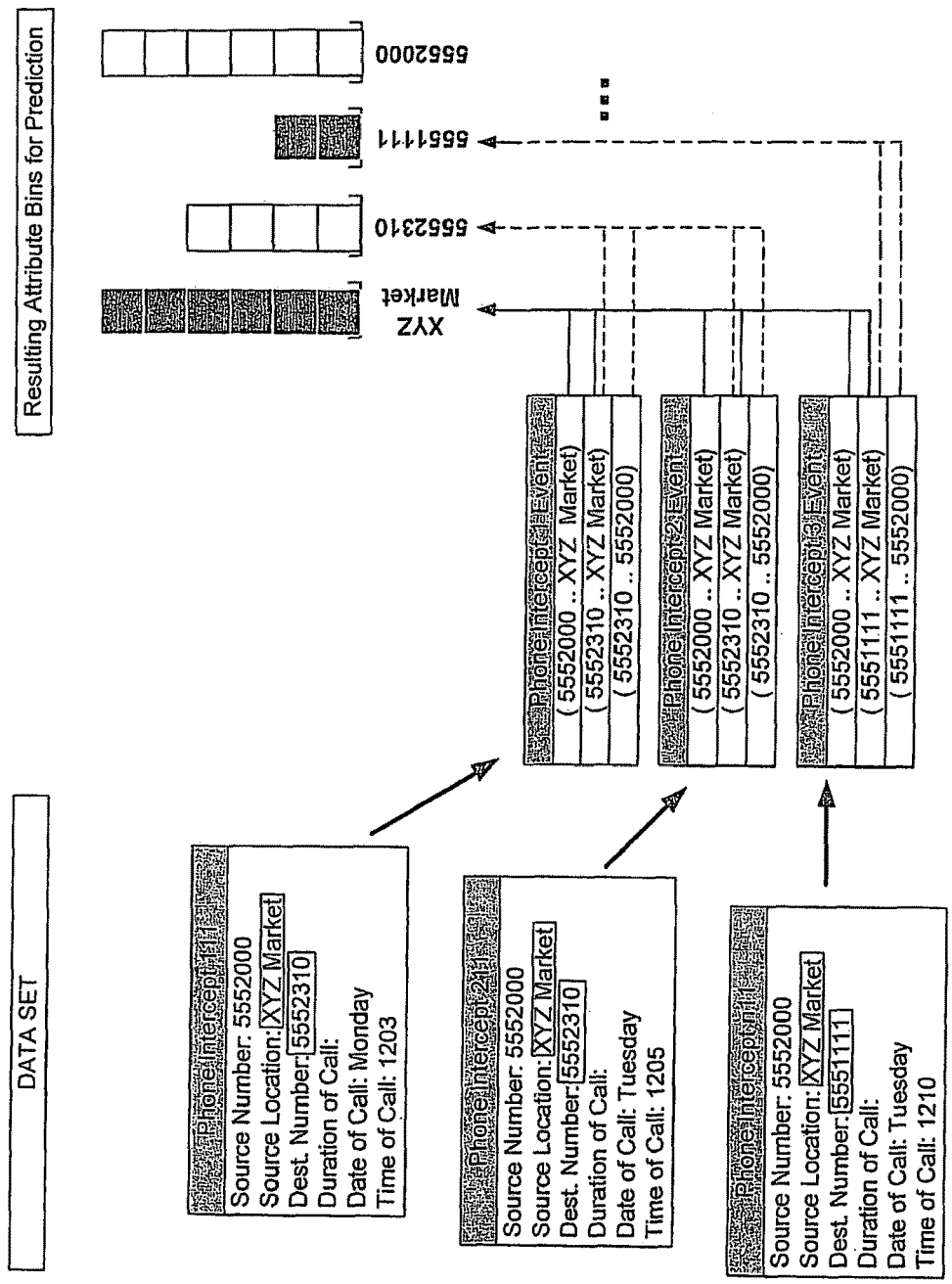
FIG. 13(b) illustrates an example of the bin generation process in one embodiment of the present invention.

The real progress of events over time is captured by analysis of all of the bins together. An example of the bin generation process is shown in FIG. 13(b). In this example, a set of phone intercepts have been determined to be highly correlated to a future event. Functionally, the importance of the bins is to reduce a set of complex events to tiny atomic correlations on a single attribute. When prediction algorithms are applied to these tiny atomic correlations, the prediction algorithms are self-controlled. The transitions restricted to a single bin are fast and the results can easily be validated but are still very powerful, because they impact the entire data set.

Figure 14:
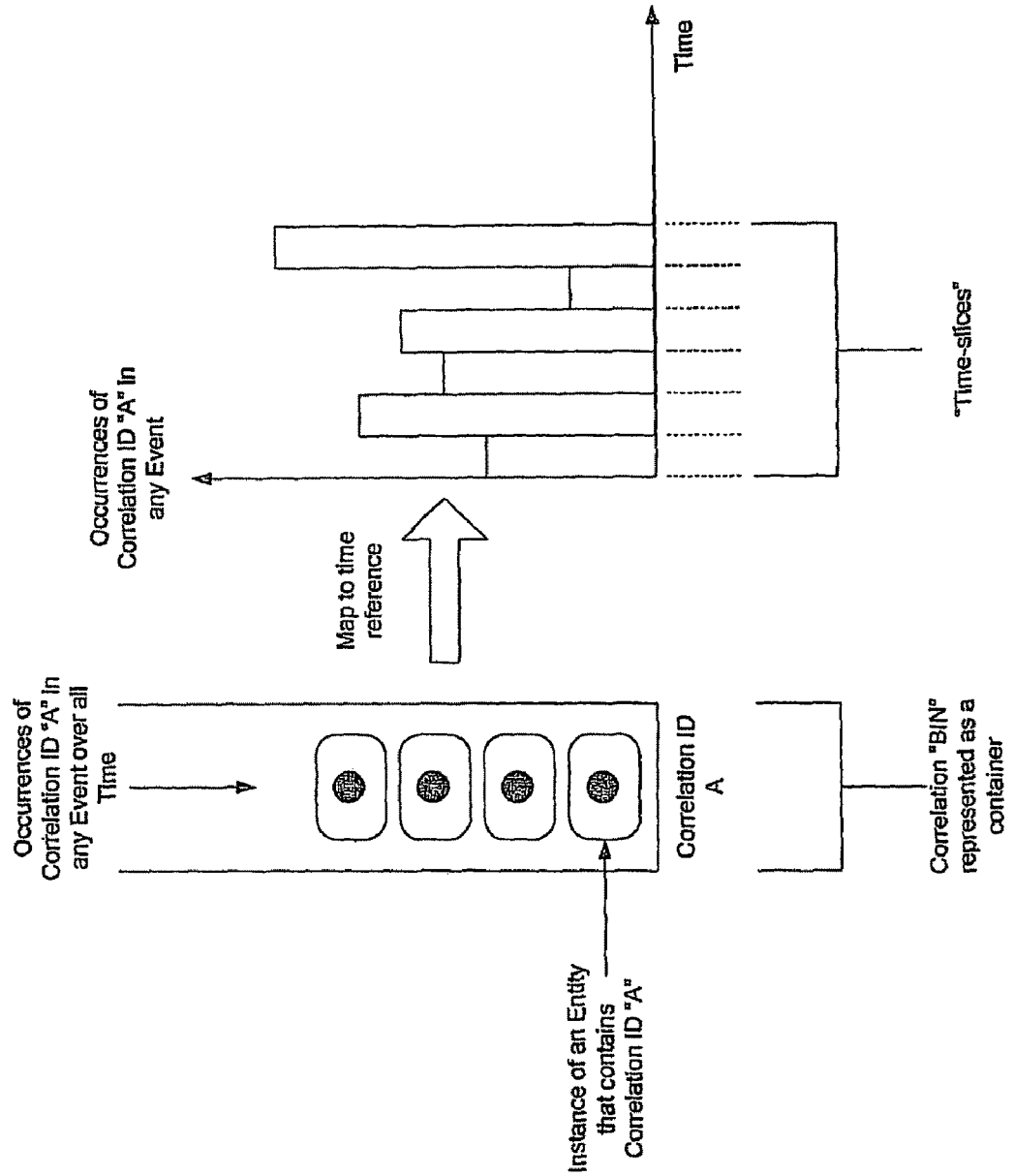
FIG. 14 illustrates an example of time-slicing being applied to the processing of correlation ID bins over time in one embodiment of the present invention.

Next, "time-slicing" is applied to the processing of bins over time, as illustrated in FIG. 14. In one embodiment of time slicing, higher order Markov chain algorithms are applied to the elements of a bin by iteration over time.

Figure 15:
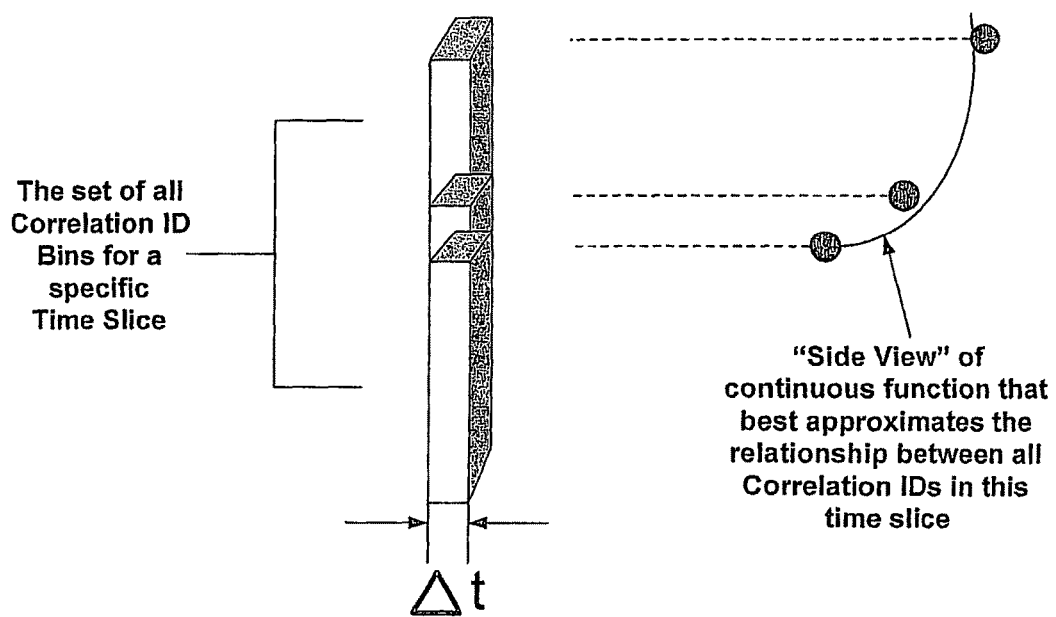
FIG. 15 illustrates an example of the relationships between the magnitudes of correlation ID bins within a time slice in one embodiment of the present invention.
Figure 16:
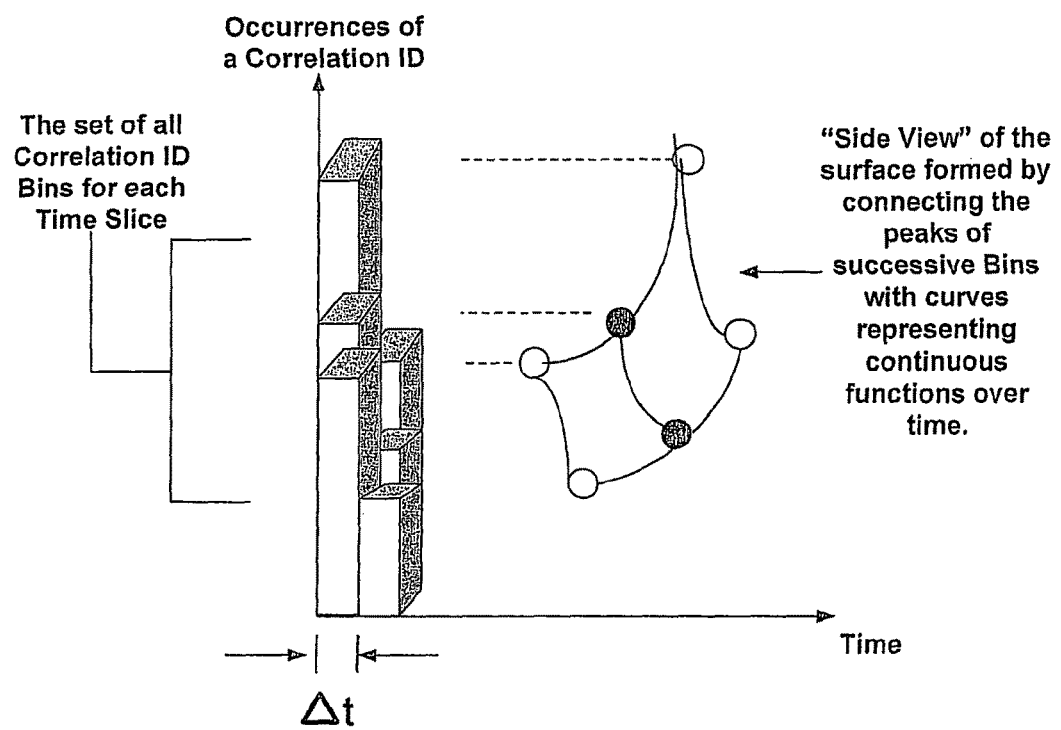
FIG. 16 illustrates an example of the relationships between the magnitudes of a correlation ID bin type across successive time slices for each bin type in one embodiment of the present invention.
Figure 17:
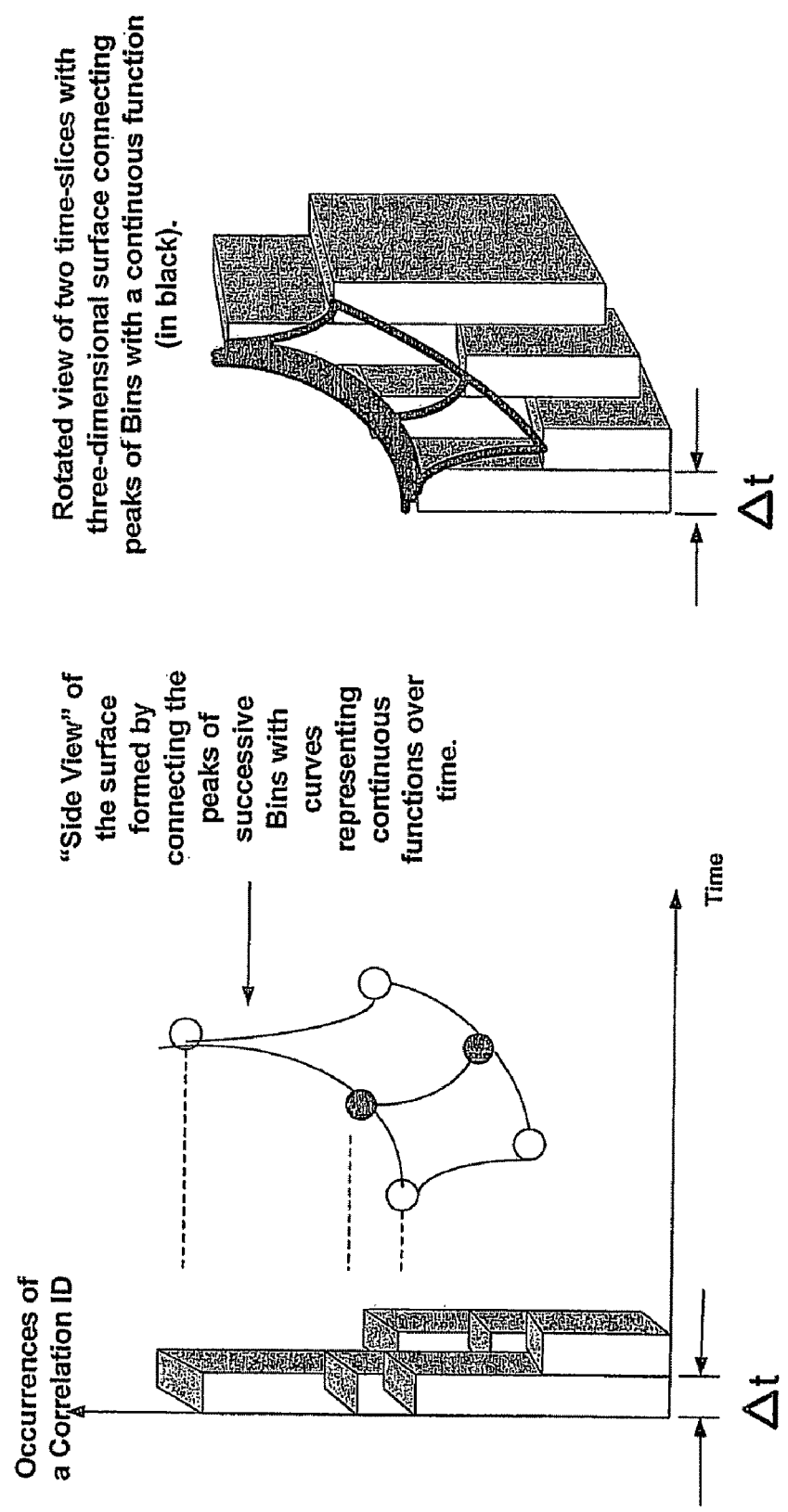
FIG. 17 illustrates an example of the relationships between the magnitudes of a correlation ID bin type across successive time slices with a three dimensional view for each bin type in one embodiment of the present invention.

To determine bin relationships within a time slice and across time slices, the distributed analysis engine determines continuous functions that best approximate:

the relationships between the magnitudes of all bins within a time slice (an example is illustrated in FIG. 15); and
the relationships between the magnitudes of a bin type across all successive time slices, for each bin type (examples are illustrated in FIGS. 16 and 17).

The theory supporting how the intra-bin and inter-bin relationships are disclosed in the following sections.

Markov Chain Monte Carlo (MCMC) Applied to a Bin Poisson Process

One of the basic examples of a continuous-time Markov chain is a Poisson process. The data set available to the distributed analysis engine of the present invention can be described as a stream of discrete events in continuous time. The natural probabilistic model for any uncoordinated stream of this type of events is the Poisson process.

We assume $(X_t)_{t \geq 0}$ as a Poisson process of rate $\lambda$. Any $(X_r: r \leq s)$ is certainly also a Poisson process of rate $\lambda$. This is independent of $s \geq 0$, $(X_{s+1} - X)_{t \geq 0}$.

If given:

$$\{X_s = i\} = \{J_i \leq s < J_{i+1}\} = J_i \leq s\} \cap \{S_{i+1} > s - J_i\}$$

Then the following is a valid assumption:

$$X_r = \sum_{j=1}^{i} 1(S_j \leq r)$$

Node Behavior Over Time

For simplicity, the magnitude of each bin in each time slice, which is shown as a data point representing the peak of each bin on the vertical axis of FIGS. 15 through 17, is referred to as a "node." The distributed analysis engine determines a function characterizing the behavior of the nodes over time for each bin type.

Once a network segment of finite nodes is established, events will collide. This will result in event paths defined by queues rather than paths which relate attributes of an object. Source and destination of a movement will stay static as long as the path occurs along nodes with average service time less than or equal to the average service time of the network layer. In one embodiment, the base model for a single network layer is a queueing network.

A Poisson process is the natural probabilistic model for any uncoordinated stream of discrete events in continuous time. Arrival in the queue at a single node forms the Poisson process. The distribution of a service time T for a given object is characterized by its distribution function:

$$F(t)=P(T<=t)$$

The Laplace transform is:

$$L(\omega) = E(e^{-\omega T}) = \int_0^\infty e^{-\omega t}\, dF(t)$$

Assuming T has a density function $f(t)$. By replacing $dF(t)$ with $f(t)dt$ the waiting time μ for a single object is:

$$\mu=E(T)=-L'(0+)$$

Assuming $Y_n$ as the number of arrivals during the nth service time, the immediate queue size after the nth departure is as follows:

$$X_{n+1}=X_n+Y_{n+1}-1_{X_n>0}$$

$Y_1, Y_2, \ldots Y_n$ as a Poisson process are independent and identically distributed because of the Markov property. This is nothing other than a discrete-time Markov chain.

If we exclude the pass to 0, $(X_n)_{n>0}$ describes a random walk with jumps $Y_n-1$.

The probability is generated by the function $$A(\upsilon) =$$

$$E(\upsilon^{Y_n}) = \int_0^\infty E(\upsilon^{Y_n} \mid T_n = t)\, dF(t) = \int_0^\infty e^{-\lambda(1-\upsilon)}\, df(t) = L(\lambda(1-\upsilon))$$

With $V_n$ as number of hits if $X_n$ to 0 before time n follows:

$$E(X_n)=E(X_0)-n(1-\rho)+E(V_n)$$

The next steps required to obtain the full equilibrium distribution based on the service-time distribution are as follows:

$$Q(\upsilon) = E(\upsilon_n^X) = \sum_{i=0}^\infty \pi_i \upsilon^i$$

$$\upsilon Q(\upsilon) = E(\upsilon^{X_{n+1}+1}) =$$

$$E(\upsilon^{X_n+Y_{n+1}+1x_n=0}) = E(\upsilon^{Y_{n+1}})\left(\pi_0 z + \sum_{i=1}^\infty \pi_i \upsilon^i\right) = A(\upsilon)(\pi_0 \upsilon + Q(\upsilon) - \pi_0)$$

$$(A(\upsilon)-\upsilon)Q(\upsilon)=\pi_0 A(\upsilon)(1-\upsilon)$$

The mean queue length is as follows:

$$(A(\upsilon)-\upsilon)Q'(\upsilon)=(A'(\upsilon)-1)Q(\upsilon)=(1-\rho)\{A'(\upsilon)(1-\upsilon)-A(\upsilon)\}$$

$$Q' = (1-\rho)\left(A'(\upsilon)\frac{(1-\upsilon)}{A(\upsilon)-\upsilon} - (1-\rho)A(\upsilon)\frac{\{(A'(\upsilon)-1)(1-\upsilon)+A(\upsilon)-\upsilon\}}{(A(\upsilon)-\upsilon)^2}\right)$$

$$\lim_{\upsilon\uparrow 1}\frac{(a'(\upsilon)-1(1-\upsilon)+A9\upsilon)-\upsilon}{(A(\upsilon)-\upsilon)^2} = \lim_{\upsilon\uparrow 1}\frac{A''(\upsilon)(1-\upsilon)}{2(A'(\upsilon)-1)(A(\upsilon)-\upsilon)} = \frac{-A''(1-)}{2(1-\rho)^2}$$

The busy period time for a single object at a particular node consists of mean queuing time plus the service time of the particular object.

Using the following Laplace transformation:

$$M(\omega)=E(e^{\omega W})$$

which can be written as:

$$M(\omega) = \frac{(1-\rho)\omega}{\omega - \lambda(1-L(\omega))}$$

The mean queue time is:

$$E(W) = -M'(0+) = \frac{\lambda L''(0+)}{2(1+\lambda L'(0+))^2} = \frac{\lambda E(T^2)}{2(1-\rho)}$$

The steps above are used to derive the formula for the busy period by counting the service time for a single object while other objects are arriving at the service node and the first object is served as:

$$B(\omega)\int_0^\infty E(e^{-\omega S} \mid T=t)\, dF(t) =$$

$$\int_0^\infty e^{-\omega t} e^{-\lambda t(1-B(\omega))}\, dF(t) = L(\omega + \lambda(1-B(\omega)))$$

After the differentiation as:

$$E(S)=-B'(0+)=-L(0+)(1-\lambda B'(0+))=\mu(1+\lambda E(S))$$

The mean busy period of a single node can be calculated as:

$$E(S) = \frac{\mu}{(1-\rho)}$$

The theory supporting how Bin relationships are determined in parallel over time is disclosed in the following section.

Parallel Generation of Node Behavior Over Time

Multivariate Markov Chain

The present invention uses an approach that examines multiple categorical data sequences from the same or similar sources to be correlated to each other. Multivariate Markov Chains form the basis of this approach. In this approach, we assume, there are s categorical sequences generated by similar sources or the same source, this is a parallel creation, and each has m possible states in the set:

$$M=1,2,3,\ldots m.$$

$X_n^i$ as the state vector of the $i^{th}$ sequence at time t. We write for the $i^{th}$ sequence in state l at time t $$X_t^i=e_l=(0,\ldots 0,1,0\ldots,0)^t.$$

The 1 in the above equation is $i^{th}$ the entry.

For a multivariate Markov chain we assume the relationship for $i=1, 2, 3, \ldots, s$ $$X_n^i + 1 = \sum_{k=1}^s \lambda_{ik} P^{(ik)} X_n^{(k)}$$

$$\lambda_{ik} \geq 0, 1 \leq i,k \leq s$$

$$\sum_{k=1}^s \lambda_{ik} = 1, \quad \text{for } i=1, 2, 3 \ldots, s$$

There is a dependency on the weighted average of $P^{(ik)}X_n^{(k)}$ for the state probability distribution of the $k^{th}$ sequence at the time (n+1). $P^{(ik)}$ is the transition probability matrix from the states in the $k^{th}$ sequence to the states in the $i^{th}$ sequence. The state probability distribution of the $k^{th}$ sequences at time n is $X_n^{(k)}$.

Multivariate Markov Chain of Higher Order

For modeling multiple categorical sequences we use the higher-order Multivariate Markov Chain model. The present invention assumes s categorical sequences with order n and each has m possible states in M. For the extended model we expect that the state probability distribution of the ith sequence at time t=r+1 has direct dependency on the state probability distribution of all sequences at times t=r, r-1, . . . , r-n+1, including itself.

The present invention then uses the previous notation of the nth-order Multivariate Markov chain model to take the form:

$$X_{r+1}^{(i)} = \sum_{k=1}^{s} \sum_{h=1}^{n} \lambda_{ik}^{(h)} P_h^{(ik)} X_{r-h+1}^{(k)}, \quad \text{for } i = 1, 2, 3 \ldots, s$$

for $i = 1, 2, 3, \ldots, s$ $$\lambda_{ik}^{(h)} \geq 0, 1 \leq i,k \leq s, 1 \leq h \leq n$$

$$\sum_{k=1}^{s} \sum_{h=1}^{n} \lambda_{ik}^{(h)} = 1, \quad \text{for } j = 1, 2, 3 \ldots, s$$

$j=1,2,3,\ldots,s$

At time t=r+1 the probability distribution of the $i^{th}$ sequence depends on the weighted average of $P_h^{(ik)}X_{r-h+1}^{(k)}$.

$P_h^{(ik)}$ is the $h^{th}$ step transition probability matrix. This describes the $h^{th}$ step transition from the states in the $k^{th}$ sequence at time t=r-h+1 to the states in) the $i^{th}$ sequence at time t=r+1 and $\lambda_{ik}^{(h)}$ as the weighting.

The problem with this type of model is that the number of transition probabilities increases exponentially, dependent to the order of the model. There is an approach by Raferty (Raferty, A (1985) A Model for Higher Order Markov Chains, Journal of Royal Statistical Society, Series B, 47:528-539), we will use, which adds only one transition probability for each extra leg.

$$P(X^{(n)} = i_0 \mid X^{(n-1)} = i_1, \ldots, X^{(n-k)} = j_k) = \sum_{i=1}^{k} \lambda_i q_{j_0 j_i}$$

with $$\sum_{i=1}^{k} \lambda_i = 1$$

$Q=[q_{ij}]$ is the transition matrix with column sums which is equal to one. It follows that:

$$0 \leq \sum_{i=1}^{k} \lambda_i q_{j_0 j_i} \leq 1, \quad j_0, j_i \in M$$

This entire approach is based on solving a non-linear optimization problem. The numerical method does not guarantee convergence. Further, even if it converges, it does not even have to provide a global maximum. Knowing these restrictions we continue to evolve the multivariate Markov chain approach in the present invention as follows:

The present invention estimates $P_{ik}^h$ as transition probabilities by counting the transition frequency. We explicitly underscore the X as not a probability distribution vector, instead $x^{(i)}$ is a probability distribution vector. The key idea of this approach is to find $\lambda_{ij}^{(h)}$. The remaining problems to solve are when the transition probabilities $\neq$ can take negative values and the sources provide missing data in the used sequences.

The distributed analysis engine of the present invention utilizes the aforementioned theory in its approach for determining the magnitudes of each bin within each successive time slice. Even though actual data is available for all time slices up to the present time, the engine attempts to predict the bins for each successive time slice, in order to compare its predicted result to actual known data, and continually improve its error margin.

The distributed analysis engine employs an algorithm for recursive learning, in order to continually improve its predictive error margin over time. For each successive time slice for which input data already exists, the algorithm compares the "predicted" magnitudes for each bin in the next time slice to the actual known values from the existing input data. This enables the engine to continually train itself and improve its error margin, via the comparison of predicted versus known data (e.g., existing data) up to and including the most recent time slice.

During the automated correlation processing stage, the present invention creates a "Situational View", or super-object, for each of the most-strongly correlated sets of information, and reports the super-objects to the analyst. In one embodiment, the analysis results are also captured in a PostrgeSQL database.

Performance is one of the base problems to solve for any data mining and/or prediction engine. In the present invention, each of the multiple software modules has focused heavily on making design choices to enable high performance of the entire system. Accurate functional capability alone is not sufficient, all software modules of the present invention must enable high performance when implemented operationally as a geographically distributed system. Examples of the design considerations made in the system of the present invention to enable high performance include but are not limited to:

Parallel Processing—The complexity and the impact of the data input architecture makes sense to have a single component, which can be load-based distributed. To achieve the desired performance, the present invention employs application control over every task in a parallelized environment.

Kernel based multi-threading—The complexity of the distributed analysis engine of the present invention enables tasks to be distributed according to the running algorithm and not in direct dependency of the kernel scheduler.

Fully Distributed Analysis System with Dynamic Synchronization of all Output—The system of the present invention operates with near-real-time performance in a geographically-dispersed environment of servers and clients, while continually processing incoming collected data, and constantly synchronizing its distributed output across the entire system. Such a fully-distributed, fully-synchronized, mining, correlation, and prediction capability represents a significant increase over current state-of-the-art systems.

The system and method of the present invention has many potential applications in at least the following fields:

Defense and Intelligence Applications—This application addresses many different and evolving threats, such as enemies with many faces and no borders—terrorism, weapons of mass destruction, proliferation, infectious diseases, cyber attacks, and illegal trafficking. For example, the present invention can provide a "Smart-Translator" to streamed information audio, video etc. is of particular interest in this area.

Financial Applications—The system and method of the present invention can be applied for detecting and predicting nefarious behavior, fraud, and predicting a market or sectors performance based on market inputs such as consumer and market behavior and current performance statistics.

Medical Applications—The system and method of the present invention can be used in support of clinical trials of treatments and drugs, and to provide a better assessment of a patients risks to certain disease based upon a much wider and diverse set of inputs, that may extend to include financial information, travel history, other environmental factors.

Information Technology and Cyber Security Applications—The system and method of the present invention can be applied to detecting and predicting nefarious behavior or quantifying and predicting system performance based on network inputs such as user and network behavior and current performance statistics.

Example

The following experiment was conducted prior to the Afghanistan elections on August $20^{th}$, anticipating there would be acts of violence related to the politics. Politics in Afghanistan are heavily influenced by tribal relationships which are not immediately apparent to Western observers. The effort described below was an experimental exercise to incorporate subtle and non-obvious factors into predictive analysis relating to the election.

The goal was to create a predictive risk analysis related to the election based on correlations between violence, tribal boundaries, and politics. The input data comes from a wide variety of sources, including UNHCR, UNICEF, Afghanistan Information Management Services, private security contractors, NGO's, internet sources, and more. For this example, the end product was a prediction of violence for the Ab Band district in Afghanistan.

The input data also comes in a variety of formats. Some formats lend themselves more to advanced analysis techniques because they come nicely structures, such as XLS or KML documents. In this example, the initial data included:

Tribal relationships and boundaries (kml);
District boundaries (kml);
Polling station locations (kml);
Descriptions of violence, including type and location (natural text); and
Tribal affiliations of political officials (natural text).

Some of the above input data is nicely structured and easily imported into the system of the present invention. For instance the input data includes a set of GIS shape files and tribal boundaries that are convertible into KIVIL using the GeoCommons appliance from FortiusOne. In this example, the GIS data included:

Jalalabad Wells;
Nangarhar health clinics;
tribal boundaries (including hierarchically organized subgroups); and
AIMS data (including boundaries of provinces, districts, roads, and villages).

Some of the input data is partially structured, such as a table in a PDF. The present invention uses a front end parser to extract data and put it into a format compatible with the present invention. For instance a large data set from the United Nations High Commission for Refugees, which profiled facts such as ethnicity, infrastructure, and economic factors relating to the reconstruction, was included in the incoming data. This input data gives an insight into the underlying factors of an area, and provides a source of data to make correlations to other data sets. In this example, the semi-structured input data included:

UNHCR District Profiles;
medical personnel and health care infrastructure by province; and
UNICEF school data by province.

Some of the input data was structured in Excel or CSV, this data included:

matrix data provided;
Afghan organizations; and
Afghan tribal hierarchy.

Some of the input data is unstructured natural text which is extracted and structured in the present invention. One such data set is a series of weekly reports of violence from a private security analyst which identifies locations and types of violence. Another example is natural text descriptions of politicians which contains their tribal affiliations. An example description of a violent event is as follows:

"An AGE group conducted a complex attack with heavy weapons and small arms on an ANP convoy in the Tarale area. The exchange occurred at approximately 1300 hrs and lasted around 15 minutes. No injuries or damage reported."

A wide variety of data was provided to the present invention, some of which has been highlighted below to illustrate the range and type of data which was analyzed. The examples are not exhaustive, and this list is not intended to represent all data types included. Examples of data included in the analysis are as follow:

Afghan Organizations—This data contains lists of organizations in government, Taliban, and media, including data on their location and tribal affiliations. An example is provided in the Table 1.

TABLE 1

| Sangeen, Maulvi | Local Commander | S. Waziristan | Zadran Tribe, from Khost | led the local militants, who refer to themselves as Pakistani Taliban, in attacking and dismantling the criminal gang of extortionists in Darpakhel area near Miramshah in late 2005/early 2006 |
|---|---|---|---|---|

Afghans in Pakistan—Amongst the statistics listed are the origin and destination of refugees displaced along international boundaries. An example is provided in Table 2.

TABLE 2

| Province of Origin | NWFP | | Balochistan | | Sindh | | Punjab | | Islamabad | |
|---|---|---|---|---|---|---|---|---|---|---|
| | FAM | IND | FAM | IND | FAM | IND | FAM | IND | FAM | IND |
| Badakshan | 1,216 | 2,514 | 205 | 1,521 | 326 | 1,094 | 94 | 531 | 2 | 13 |
| Baghlan | 14,014 | 72,187 | 3,878 | 24,168 | 3,825 | 18,759 | 3,916 | 19,837 | 891 | 4,638 |
| Balkh | 5,998 | 28,883 | 3,408 | 21,051 | 664 | 3,005 | 1,322 | 6,717 | 51 | 263 |
| Faryab | 2,341 | 8,888 | 2,479 | 14,476 | 1,737 | 8,260 | 590 | 2,628 | 2 | 5 |

District profiles—The district profiles contain a variety of information which may indicated dissatisfaction, such as the percentage of houses that have been destroyed and potable water. An example is provided in Table 3.

TABLE 3

SECTORAL INFORMATION

| Percentage of houses destroyed | More than 4,695 (15%) |
|---|---|
| Housing Situation of Returning Population: | Many have recuperated their houses and some are living with relatives and host families or in a part of their own houses. |
| Type of Potable Water Sources: | Spring, river and wells. |
| Availability of Potable Water: | 20% |
| Sanitation and Drainage: | Traditional system. |

Figure 18:
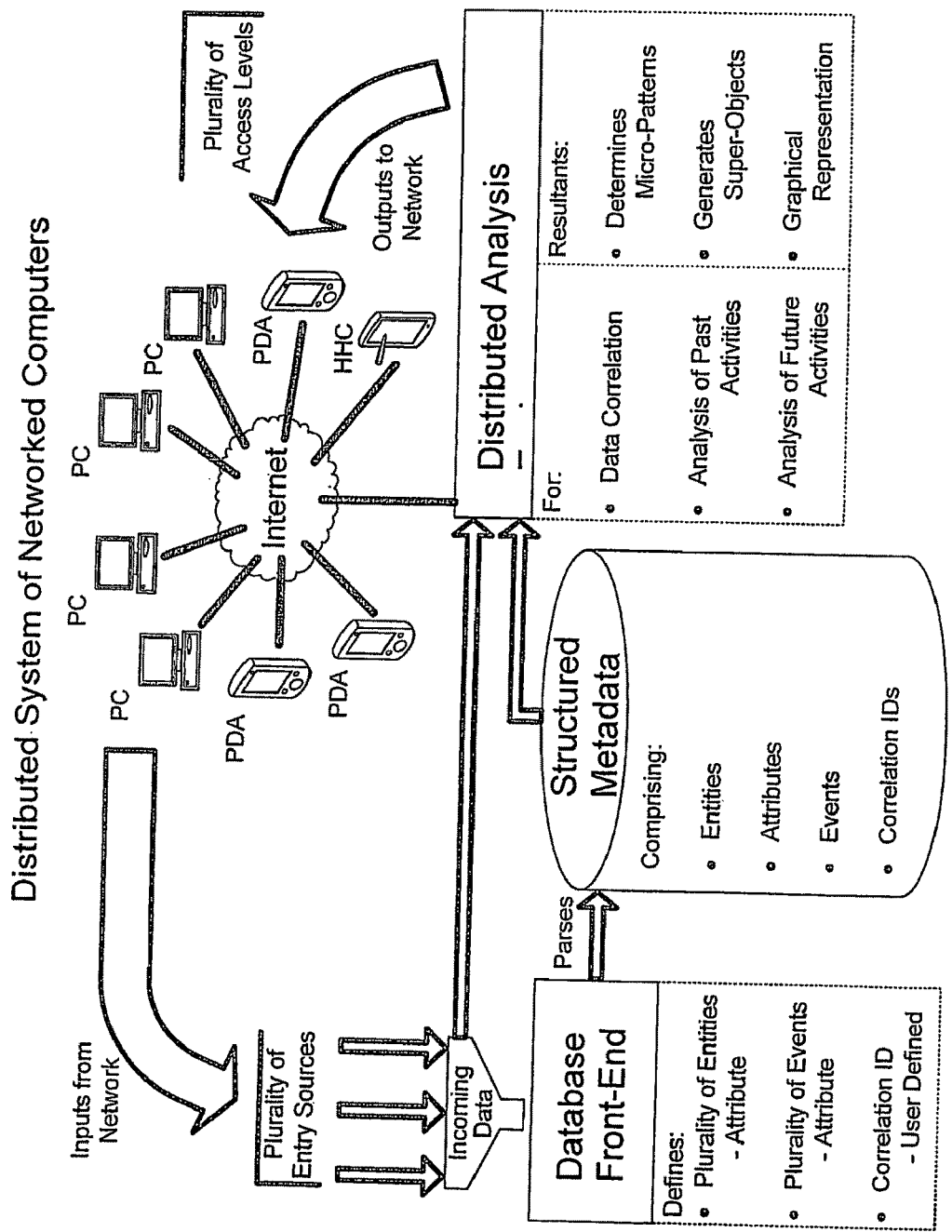
FIG. 18 illustrates the hardware configuration used in the example application of the present invention.

The configuration of the system of the present invention used in this example is shown in FIG. 18.

During events like elections lots of new players come out to the field, and face the difficult task of orienting and prioritizing their efforts. The present invention enables users to visualize predictions in complex environments to help people like election observers understand the environment they are about to work in. In this example, the present invention built a predictive threat assessment for the elections, for election observers.

The predicted levels of violence and actual levels of violence that occurred during the predicted periods for one district is shown in Table 4.

TABLE 4

| AB BAND | August | September | October | November |
|---|---|---|---|---|
| Predicted | 8.49 | 8.49 | 10.5497 | 12.5541 |
| Real | 9.87209 | 11.5222 | 13.2868 | 13.9181 |
| Accuracy % | 86 | 84 | 79.4 | 90.2 |

As shown Table 4, the predicted level of violence and actual violence levels encountered during the predicted months for the Ab Band district of Afghanistan correlated with an accuracy of 79.2 to 90.2%. The capabilities provided by the present invention are very useful to decision makers, particularly in complex environments.

While the present invention has been particularly shown and described with reference to the preferred mode as illustrated in the drawings, it will be understood by one skilled in the art that various changes in detail may be effected therein without departing from the spirit and scope of the invention as defined by the claims.

I claim:

1. A method of data correlation and analysis of past activities and prediction of future activity using a distributed analysis engine, the method comprising:

establishing a database comprising structured metadata on at least one computer and a distributed system of networked computers comprising a plurality of levels each having at least one personal computer, wherein an entry level of the plurality of levels further comprises at least one personal digital assistant or hand held computer;

configuring a database front-end to parse incoming data, the database front-end defining a plurality of entities, one or more attributes for each entity of the plurality of entities, a plurality of events, one or more attributes for each event of the plurality of events, and one or more correlation IDs, the correlation IDs being user defined attribute relationships that correlate events and entities in the database;

collecting data from a plurality of sources;

parsing the incoming data in the database front-end into structured metadata comprising one or more of entities, attributes, events and correlation IDs; and said distributed analysis engine:

correlating the structured metadata of the incoming data with structured metadata in the database and determining micro-patterns in the structured metadata using said distributed analysis engine;

generating a graphical representation of a composite network of determined micro-patterns in the structured metadata between events and entities in the incoming structured metadata and structured metadata in the database as one or more super-objects; and predicting future activity from the one or more super-objects representing the determined micro-patterns.

2. The method of claim 1, wherein said correlation IDs determine hidden deep nested dynamic and static relationships between events and entities in the structured metadata of the incoming data and structured metadata in the database.

3. The method of claim 1, wherein determining micro-patterns in the structured metadata further comprises comparing a portion of the structured metadata in the database with the structured metadata of the incoming data and sequentially comparing other portions of the structured metadata in the database with the structured metadata of the incoming data.

4. The method of claim 1, wherein the portions of the structured metadata in the database are random portions that are less than 30% of the structured metadata in the database.

5. The method of claim 1, wherein the collected data comprises at least one of numeric data and binary data.

6. The method of claim 1, wherein the collected data comprises at least one of imagery data, natural language text, observation data and categorical data.

7. The method of claim 1, wherein the super-object comprises a vertex and a plurality of edges, each edge representing a correlation between at least one of different entities, entities and events, and different events in the data and the vertex of the super-object has the most edges in the super-object.

8. The method of claim 1, further comprising conditioning the incoming data to fill in missing values within a context before parsing the incoming data into structured metadata.

9. The method of claim 1, wherein determining micro-patterns in the data to generate super-objects further comprises the steps of:
- identifying relationships among attributes of different entities;
- determining a strength of the identified relationships; and
- generating super-objects for reporting and display to a user.

10. The method of claim 9, wherein the step of determining the strength of the identified relationships comprises using statistical methods to obtain a distribution function for one or more correlation IDs.

11. The method of claim 1, wherein at least some of the past activities are selected from the group consisting of social network activities, criminal activities, terrorist activities, IED activities, computer network activities and financial activities, and the predicted future activity is an activity of the same type.

12. A distributed system of networked computers having a distributed analysis engine for data correlation and analysis of past activities and prediction of future activity, the system comprising:
- a distributed system of networked computers comprising a plurality of levels each having at least one personal computer, wherein an entry level further comprises at least one personal digital assistant or hand held computer; and
- a database comprising structured metadata, the database further comprising a database front-end configured to parse incoming data, wherein the database front-end defines a plurality of entities, one or more attributes for each entity of the plurality of entities, a plurality of events, one or more attributes for each event of the plurality of events, and one or more correlation IDs, the correlation IDs being user defined attributes that correlate between events and entities in the database;
- wherein the distributed system of networked computers receives data from a plurality of sources;
- the database front-end parses the incoming data into structured metadata comprising one or more of entities, attributes, events and correlation IDs, and
- the distributed analysis engine correlates the structured metadata of the incoming data with structured metadata in the database, determines micro-patterns in the structured metadata, generates a graphical representation of a composite network of determined micro-patterns in the structured metadata between events and entities in the data as one or more super-objects, and predicts future activity from the one or more super-objects representing the determined micro-patterns in the structured metadata.

13. The system of claim 12, wherein the structured metadata in said database is accessible from multiple distributed locations, each location having one or more levels of access.

14. The system of claim 13, wherein the levels of access are hierarchical with each increasing level of access having access to more detailed information.

15. The system of claim 12, wherein said correlation IDs determine hidden, deep nested dynamic and static relationships between events and entities in the structured metadata of the incoming data and structured metadata in the database.

16. The system of claim 12, wherein the collected data comprises at least one of numeric data and binary data.

17. The system of claim 12, wherein the collected data comprises at least one of imagery data, natural language text, observation data and categorical data.

18. The system of claim 12, wherein the super-object comprises a vertex and a plurality of edges, each edge representing a correlation between at least one of different entities, entities and events, and different events in the structured metadata and the vertex of the super-object having the most edges in the super-object.

19. The system of claim 12, wherein the distributed analysis engine generates super-objects by identifying relationships among attributes of different entities, determining a strength of the identified relationships, and generating super-objects for reporting and display.

20. The system of claim 19, wherein the distributed analysis engine compares a portion of the structured metadata in the database with the structured metadata of the incoming data and sequentially compares other portions of the structured metadata in the database with the structured metadata of the incoming data.

21. The system of claim 20, wherein the portions of the structured metadata in the database are random portions of the data that are less than 30% of the structured metadata in the database.

22. The system of claim 12, wherein the distributed analysis engine conditions the incoming data to fill in missing values within a context before parsing the incoming data into metadata.

23. The system of claim 12, wherein the distributed analysis engine determines a strength of the identified relationships using statistical methods to obtain a distribution function for one or more correlation IDs.

24. The system of claim 12, wherein at least some of the past activities are selected from the group consisting of social network activities, criminal activities, terrorist activities, IED activities, computer network activities and financial activities, and the predicted future activity is an activity of the same type.

25. A method of evaluating data and analysis of past activities and prediction of future activity, the method comprising:
- entering into a database on at least one computer a plurality of entity types, each entity type comprising a sequence of at least one character;
- entering into a database a plurality of entity values, each entity value being indexed to one of the entity types;
- entering into a database a plurality of attribute types, each attribute type comprising a sequence of at least one character;
- entering into a database a plurality of attribute values, each attribute value being indexed to one attribute type and comprising a sequence of at least one character;
- entering into a database at least one event, each event comprising at least two values selected from the group consisting of said entity values and said attribute values;
- entering into a database at least one correlation ID, each correlation ID being a user defined attribute relationship linking an attribute type of one of said entity values to an attribute type of at least another of said entity values;
- collecting data from a plurality of sources using a distributed system of networked computers, the distributed system of networked computers comprising a plurality of levels each having at least one personal computer, wherein an entry level of the plurality of levels further comprises at least one personal digital assistant or hand held computer;
- parsing incoming data in the database front-end into structured metadata comprising one or more of entities, attributes, events and correlation IDs, and
- correlating the structured metadata of the incoming data with structured metadata in a database and determining micro-patterns in the structured metadata using a distributed analysis engine by associating at least two of entities and events to form a super-object, the super-object having a vertex and at least one edge value, wherein the vertex of the super-object is the one having the most edges in the super-object, and each edge value relates entities and events having an attribute type and attribute value in common that equals or exceeds a threshold edge value, and predicting future activity from the super-object representing the determined micro-patterns in the structured metadata.

26. The method of claim 25, further comprising displaying the super-object to a user as a graphical representation of a composite network of determined micro-patterns in the structured metadata between events and entities.

27. The method of claim 25, wherein at least some of the past activities are selected from the group consisting of social network activities, criminal activities, terrorist activities, IED activities, computer network activities and financial activities, and the predicted future activity is an activity of the same type.

* * * * *